Aug. 19, 1952     H. H. CARY ET AL     2,607,899
INFRARED SPECTROPHOTOMETER
Filed Jan. 14, 1947     6 Sheets-Sheet 5
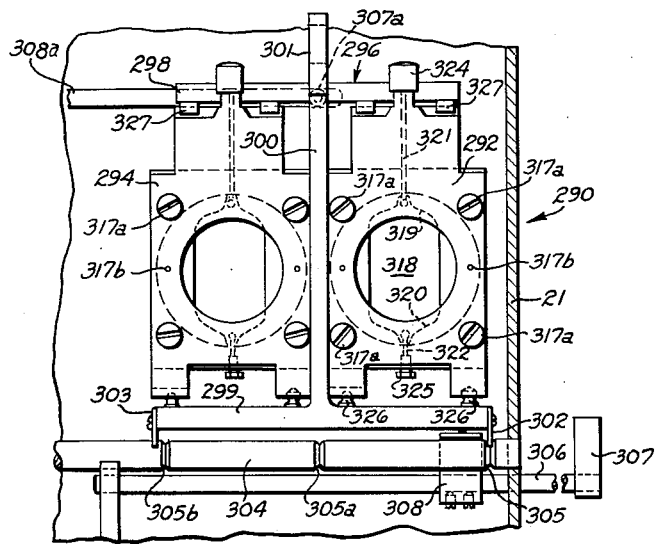
Fig. 13
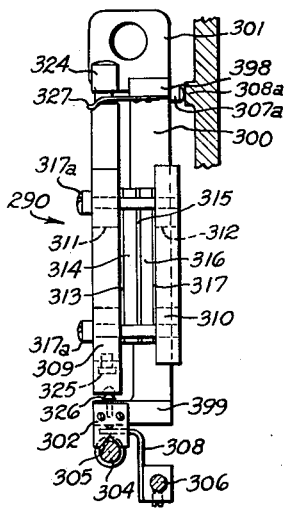
Fig. 14
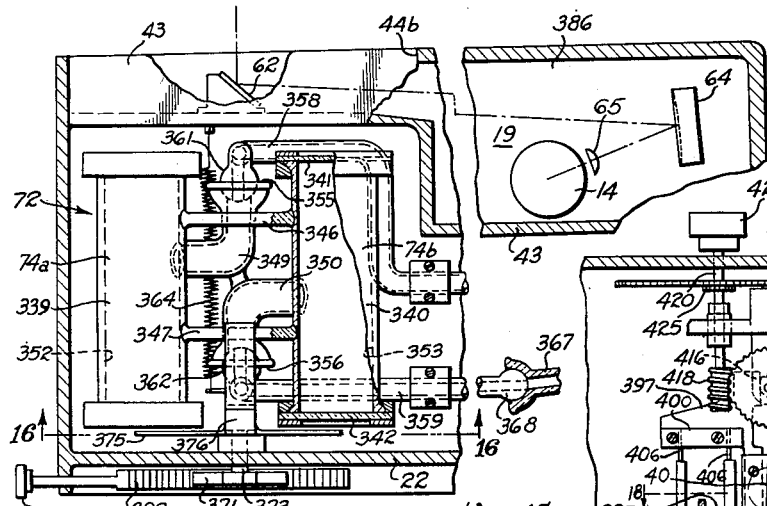
Fig. 15
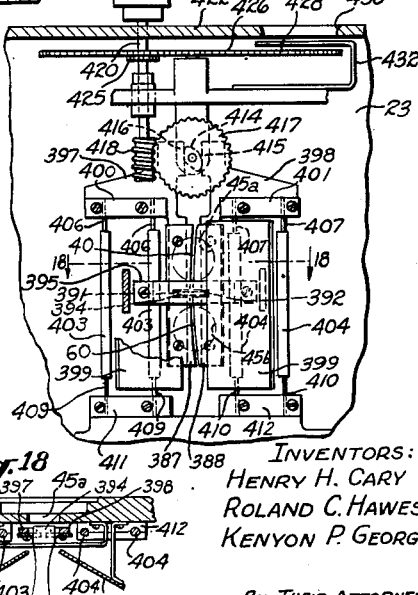
Fig. 17
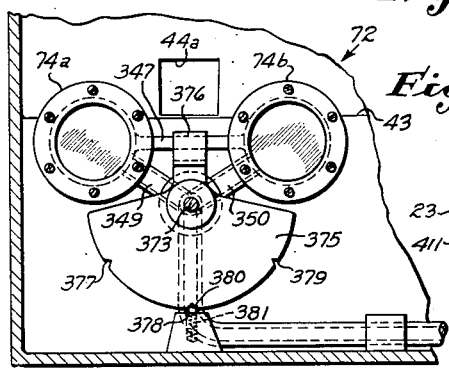
Fig. 16
Fig. 18
INVENTORS:
HENRY H. CARY
ROLAND C. HAWES
KENYON P. GEORGE
BY THEIR ATTORNEYS
HARRIS, KIECH, FOSTER & HARRIS

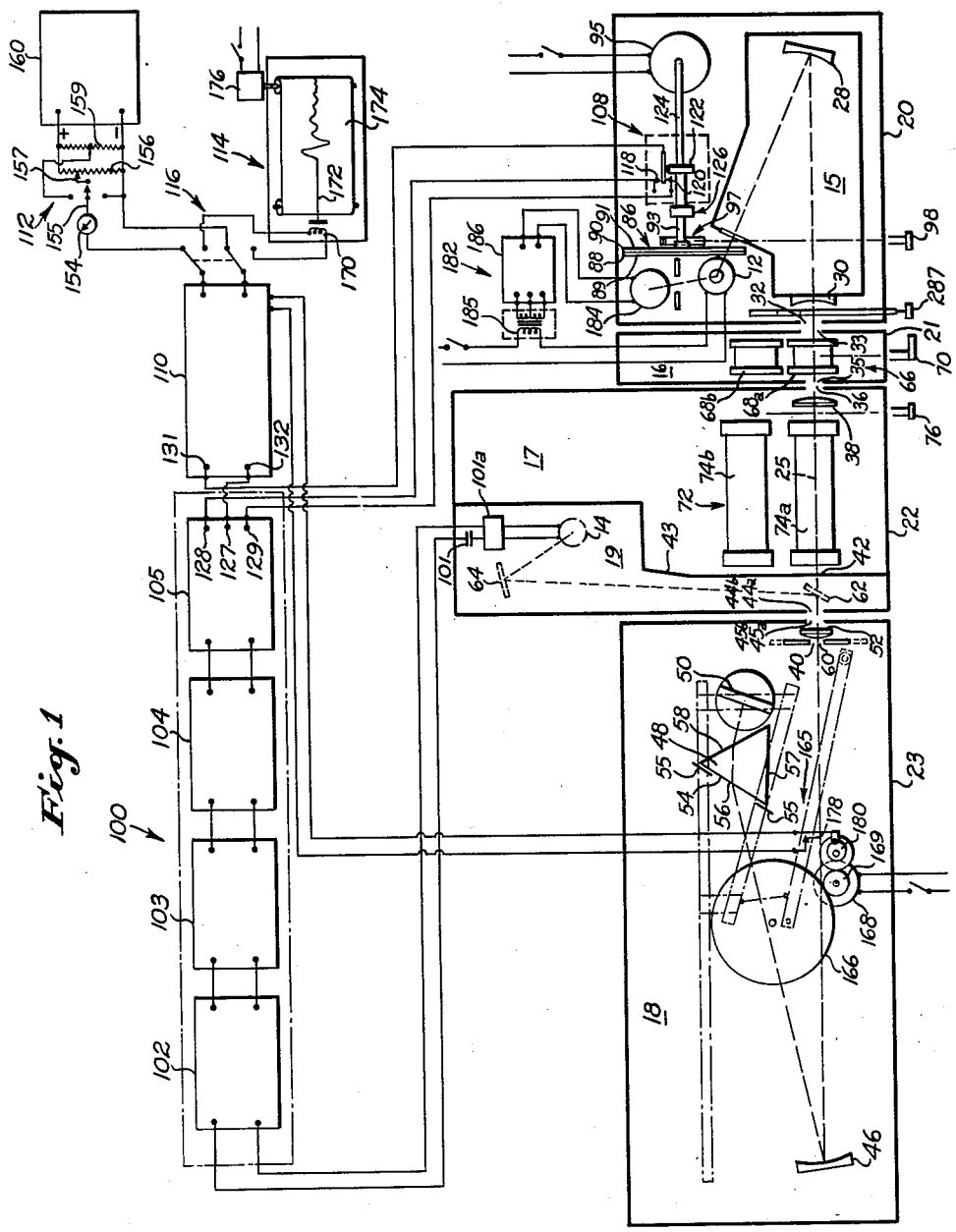

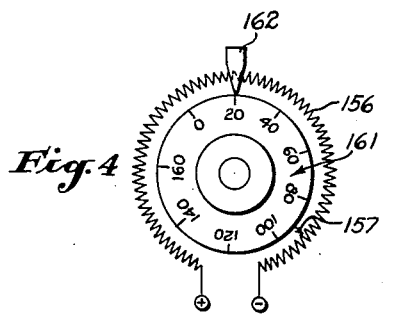
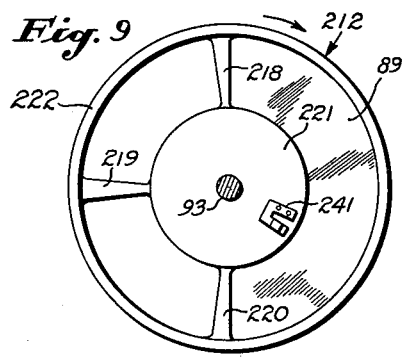
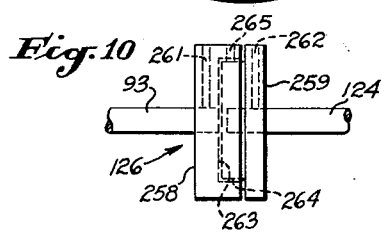
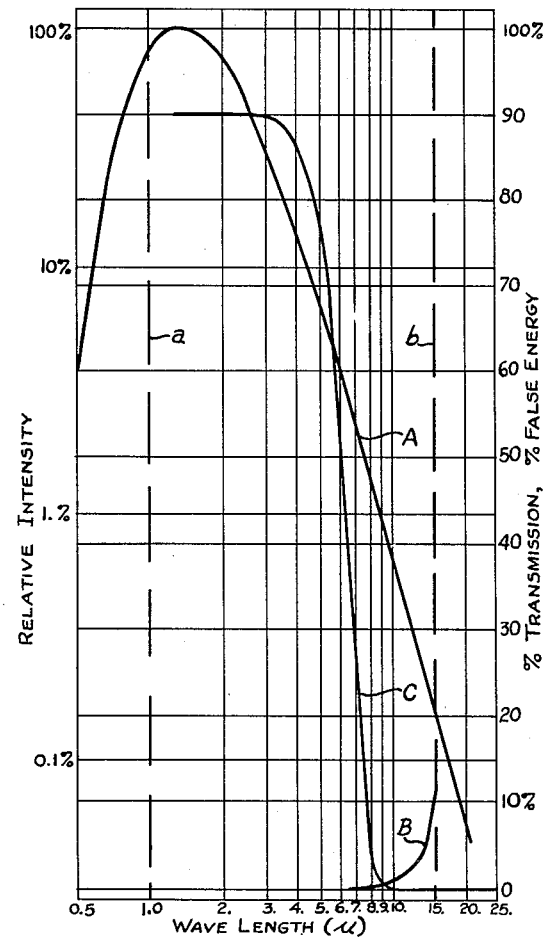
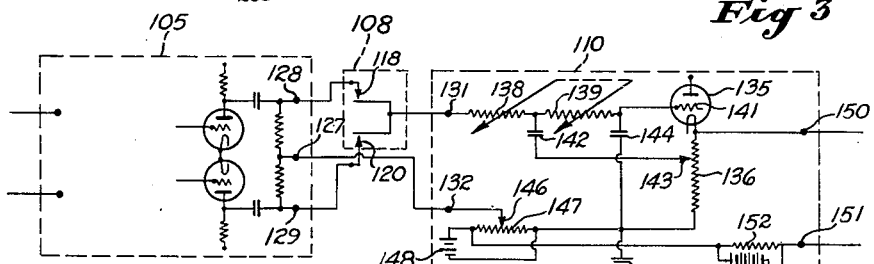
Inventors:
Henry H. Cary
Roland C. Hawes
Kenyon P. George
By Their Attorneys
Harris, Kiech, Foster & Harris

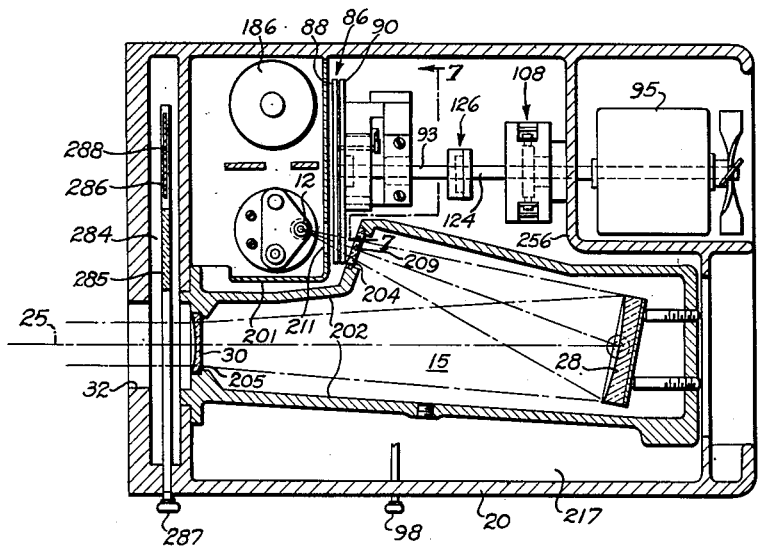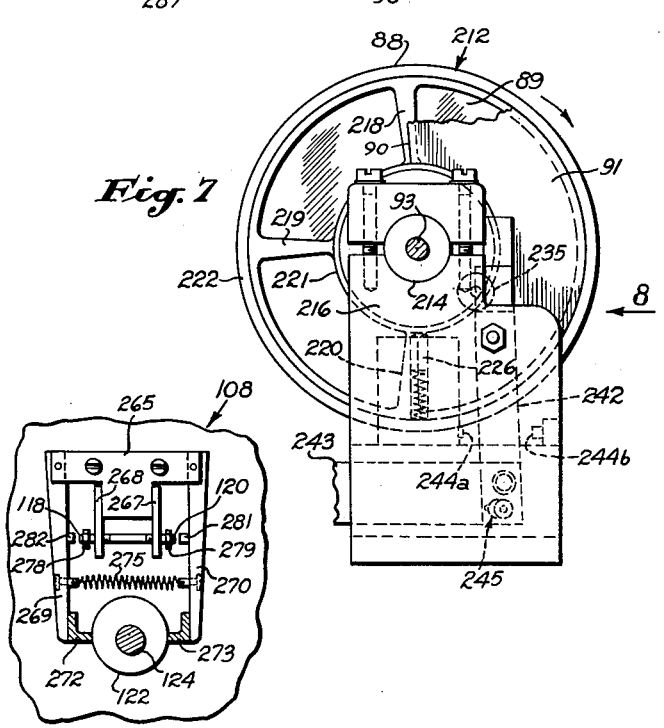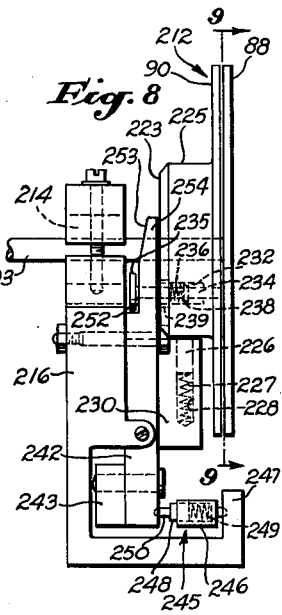

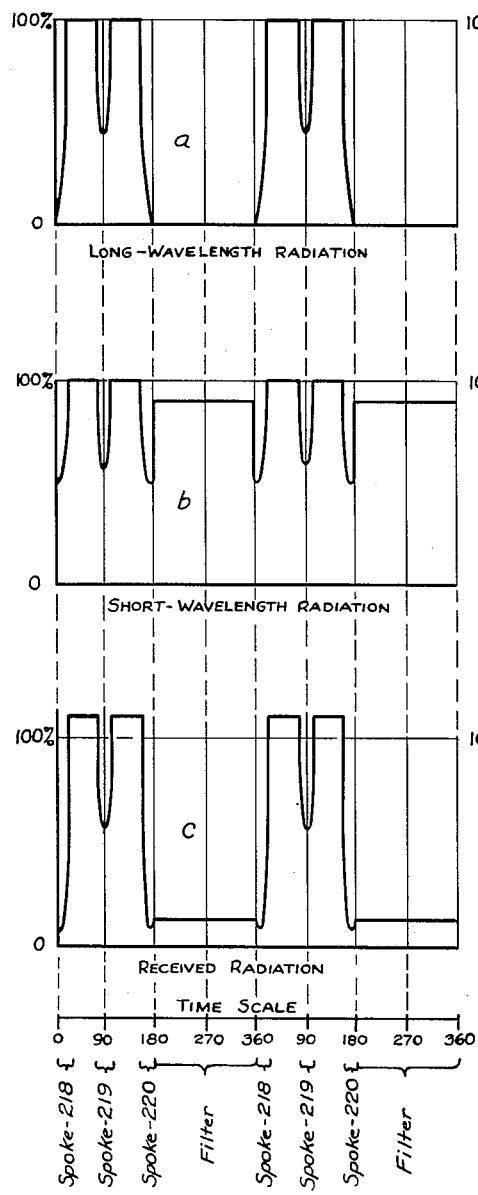
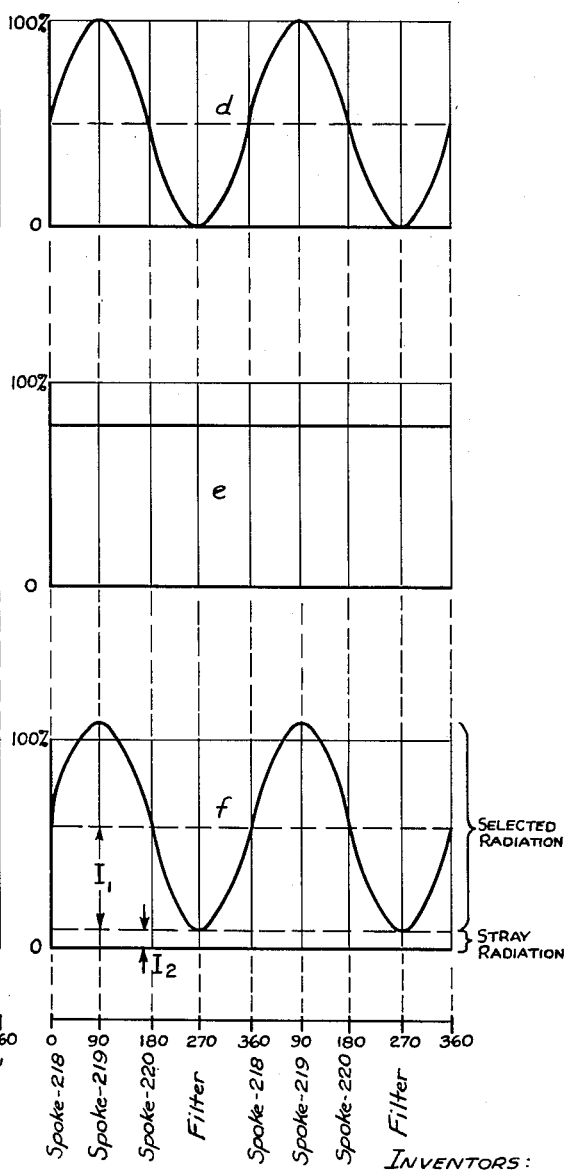

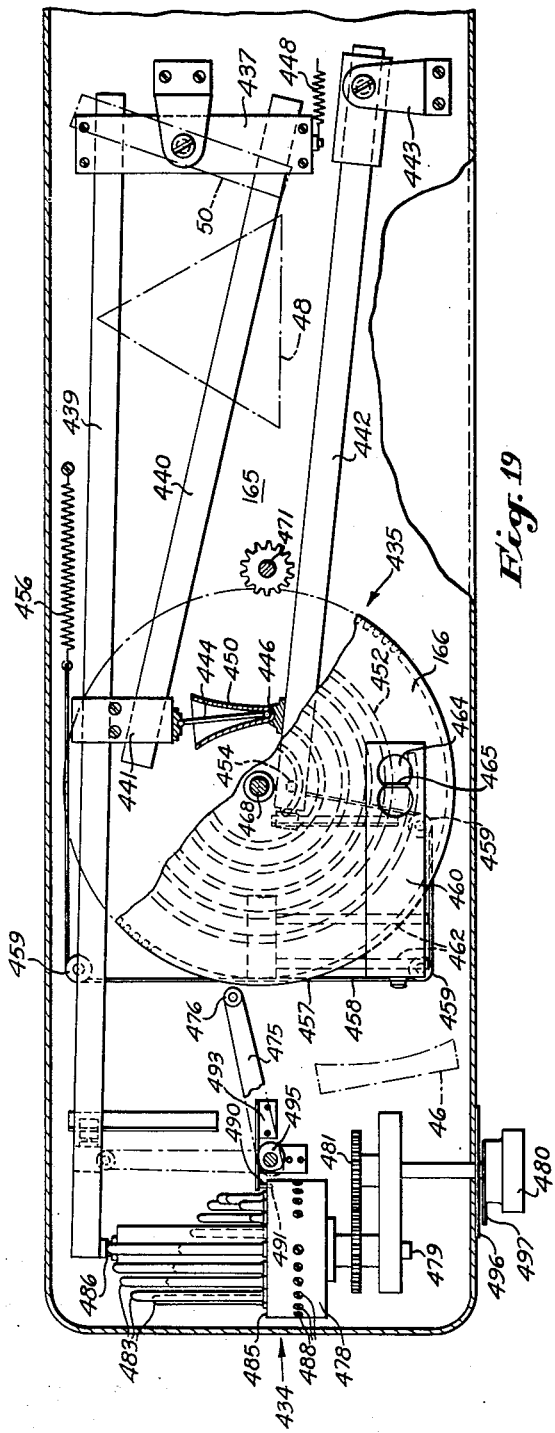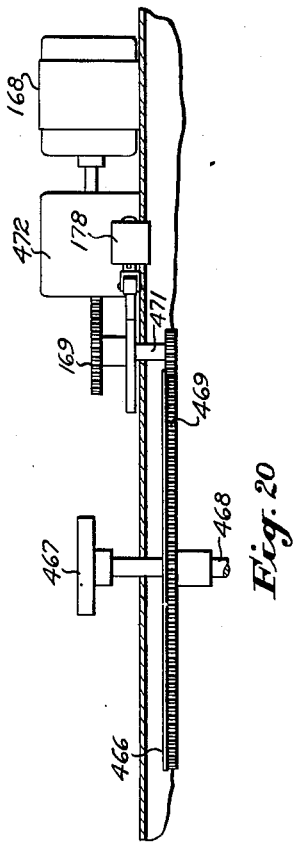

Patented Aug. 19, 1952

2,607,899

UNITED STATES PATENT OFFICE 2,607,899

INFRARED SPECTROPHOTOMETER

Henry H. Cary, Alhambra, Roland C. Hawes, Los Angeles, and Kenyon P. George, South Pasadena, Calif., assignors to Beckman Instruments, Inc., a corporation of California Application January 14, 1947, Serial No. 722,038

18 Claims. (Cl. 250—83.3)

This invention relates to the art of spectrometry and more particularly both to improved methods and improved apparatus for making chemical analyses by absorption spectrophotometry.

While the principles involved in this invention may be applied to various types of spectrometers, and various methods of spectrometry, the invention finds its widest appliction in the field of infra-red spectrometry. Accordingly, the principles of the invention will be illustrated with particular reference to their application in the field of infra-red spectrometry. However, it is to be understood that these principles may also be applied to other forms of spectrometry, so that the disclosure of the specific application of these principles in the field of infra-red spectrometry, is not to be considered a limitation of the invention thereto.

In the practice of absorption spectrometry, radiation is usually transmitted from a source through a monochromator to a radiation detector by means of a suitable optical system. Spectrometers have recently been widely used for analyzing chemical mixtures and in such instruments it is customary to use as a source of radiation a radiating element which emits radiation which is rich in energy in the wavelength region under investigation, even though the distribution of energy in the region in question be far from uniform. The radiation transmitted from the source into the monochromator is separated therein by a dispersing element such as a prism or grating so as to enable the projection of selected radiation, that is, radiation in a narrow predetermined wavelength band, to the detector. The optical system generally includes lenses, mirrors, and filters. Usually the detector is in the form of a thermocouple or other radiation sensitive device and a change occurring in some property of the detector in accordance with the intensity of radiation falling therein is measured by means of an electrical circuit connected thereto.

In the practice of spectrometry, numerous difficulties are encountered which render the analysis tedious and expensive, and sometimes even inaccurate.

In particular, when analyzing liquid or solid samples, it is found that the insertion of the sample into the path of the beam alters the optical paths to such an extent that the size and shape of an image in the optical path is also often modified to such an extent that the sensitivity of the system is seriously changed. The refocusing or recalibration, of the spectrometer under such circumstances is, to say the least, highly undesirable.

In any spectrometer serious difficulties in the analysis arise from the fact that stray radiation, other than that of the predetermined wavelength desired, also reaches the radiation detector, thus creating a false indication of the amounts of radiation of predetermined wavelength being transmitted thereto through the sample under test. Such stray radiation is known as false energy radiation. Its presence at the detector is accounted for partly by virtue of the fact that appreciable proportions of all radiation striking various optical and other surfaces in the spectrometer are scattered therefrom in every direction by reason of imperfections in these surfaces. This scattered radiation and other stray radiation that may be present is further scattered and reflected at various surfaces within the spectrometer, thus causing some of it to reach the detector by devious paths. The proportion of radiation striking the detector which is false energy radiation is undesirably great, particularly when measurements are being made in a weak portion of the spectrum.

Another problem arising in the practice of spectrometry results from the fact that the intensity of radiation emitted from the source may fluctuate. Ordinarily, attempts are made to overcome this difficulty by utilizing a null or balancing technique wherein two beams from the source are detected, one of the beams traveling along one path and through the sample under test, and the other traveling along a second path but not through that sample. This of course results in a multiplication of numerous optical elements in the spectrometer or in the uneconomical use of those present. It has the further objection that the difficulties of producing and maintaining spectral equivalence of the two optical paths are great, particularly in the infra-red wavelength regions where it may be necessary to use easily damaged materials such as rock salt as optical elements.

In the art of spectrometry it is generally considered desirable to provide an arrangement which is suitable for making measurements at selected predetermined wavelengths and also alternatively to scan a wide continuous portion of the spectrum to obtain a record of intensities at all wavelengths in that portion. When making a single wavelength measurement, it is desired to indicate the transmission or absorption coefficient of the sample under test directly. In both procedures, fluctuations in the signal strength occur, because of electrical or other variations, often termed noise, having their origin in various parts of the apparatus such as in an electrical amplifier connected to the detector. It is desirable to reduce the effect of such noise as much as possible so as to increase the accuracy and reliability of the measurements.

It is often desirable to use a rotating shutter for periodically intercepting the beam of radiation transmitted from the source to the detector and to use an amplifying system which is selectively responsive to a signal striking the detector at the frequency of beam interruption. The use of such an arrangement serves two main purposes. First, it reduces the effect of variation in the temperature of the wall of the spectrometer, insofar as such variation in temperature produces changes in the amount of stray radiation reaching the detector. This is especially important in the infra-red region wherein such variations are particularly serious because of the large amount of black-body radiation in the wavelength region in question at normal atmospheric temperatures. Secondly, the use of such a system facilitates the application of alternating-current amplifier design techniques in the indicating system.

Having in mind the problems present in the art of spectrometry, and also the requirements desired in a commercial instrument, it is a general object of the invention to provide an improved spectrometer of compact, flexible construction in which these and other difficulties are overcome.

Another object of the invention is to provide a spectrometer having convenient sample-testing means adapted for investigating solid, liquid, and gas samples.

Another object of the invention is to provide a spectrometer with a liquid-sample testing arrangement which permits the insertion and removal of a liquid sample from the path of the beam without seriously disturbing the overall optical adjustment and calibration.

Another object of the invention is to provide a spectrometer with a solid-sample testing arrangement having similar qualities.

Another object of the invention is to provide a spectrometer in which the optical system establishes a region in which the beam is collimated and a region in which the beam is not collimated and to provide a means for inserting liquid or other non-gaseous samples in the region of the collimated beam and gas samples in the region of the non-collimated beam, so as to facilitate use of the spectrometer for analysis of either kind of sample without requiring recalibration.

Another object of the invention is to provide a spectrometer with an improved arrangement for inerchanging samples in the beam.

Another object of the invention is to provide a spectrometer which utilizes only a single beam but which is substantially free of spontaneous calibration fluctuations, either those resulting from "zero shift," or changes in instrument response when the radiation beam from the source to the detector is cut off for extended periods of time, or those resulting from fluctuations in emission from the source.

Another object of the invention is to provide in the amplifying system of the spectrometer, means for adjusting the time response characteristic of the signal appearing at the output.

Another object of the invention is to provide an improved method and means for reducing the effects of stray radiation in a spectrometer.

A further object of the invention is to provide a spectrometer with a beam interrupting shutter which causes the intensity of radiation of a predetermined wavelength to vary periodically in amplitude while the intensity of certain false energy radiation reaching the detector remains substantially constant, so as to permit discrimination of the radiation of predetermined wavelength from the false energy radiation in an alternating-current amplifier connected to the detector.

Another object of the invention is to provide a spectrometer with a pair of beam-interrupting shutter means each of which serves to vary the intensity of selected radiation directed to the detector in different portions of the spectrum in order to minimize the deleterious effects of stray radiation throughout the entire spectrum.

Another object of the invention is to provide a spectrometer using a beam-interrupting shutter with a rectifier in the circuit connected to the detector which may be adjusted to operate in synchronism with the signal resulting from the action of the rotating shutter.

Another object of the invention is to provide a spectrometer with an improved arrangement for selectively setting the monochromator to direct radiation of predetermined wavelengths to the detector.

Other objects of this invention, together with numerous advantages thereof, will become apparent in the course of the following detailed description of the invention as applied to an infrared spectrophotometer:

Referring to the accompanying drawings, wherein like numerals in the several views refer to identical parts:

Fig. 1 is a schematic diagram of a spectrophotometer incorporating the features of this invention;

Fig. 2 is a wiring diagram of a portion of the amplifier circuit including the mechanical rectifier;

Fig. 3 is a graph representing various spectral characteristics of parts of this spectrophotometer;

Fig. 4 is a diagram of a direct reading absorption and transmission coefficient measuring device;

Fig. 5 is a diagram illustrating mechanical details of the rectifier;

Fig. 6 is a plan view, partly in section, showing details of construction of the compartment of the spectrophotometer including the radiation source;

Fig. 7 is an end view of the shutter arrangement taken on the line 7—7 of Fig. 6;

Fig. 8 is a rear elevational view of the shutter arrangement, taken as indicated by the arrow 8 of Fig. 7;

Fig. 9 is a detail view of a portion of the shutter clutching apparatus, being taken along the line 9—9 of Fig. 8;

Fig. 10 is a detail view of the shaft coupling;

Figs. 11 and 12 are graphs used in explaining the operation of the shutter mechanism;

Fig. 13 is a fragmentary elevational view of the liquid-sample compartment, illustrating details of the liquid-sample holder arrangement;

Fig. 14 is an end view of the liquid-sample holder arrangement;

Fig. 15 is a plan view, partly in section, of the gas-sample compartment of the spectrophotometer;

Fig. 16 is an end view of the gas sample-holding apparatus taken on the line 16—16 of Fig. 15;

Fig. 17 is an elevational view of the slit-width-control mechanism of the monochromator;

Fig. 18 is a cross-sectional view, taken along the line 18—18 of Fig. 17;

Fig. 19 is a plan view of the monochromator with the cover removed; and

Fig. 20 is an elevational view showing details of the scanning mechanism of the monochromator.

*Apparatus in general*

Referring to the drawings and more particularly to Fig. 1, there is illustrated a spectrophotometer embodying the features of this invention. The spectrophotometer includes an optical system for transmitting radiation in narrow predetermined wavelength bands from a radiation source 12 to a radiation detector 14 along a predetermined path passing through an auxiliary gas-sample test region 15, a liquid-sample test region 16, a gas-sample test region 17, and a monochromator 18. The monochromator separates heterogeneous radiation into its components and directs radiation of a selected predetermined wavelength band to the detector.

Generally speaking, the spectrophotometer itself comprises four compartments 20, 21, 22 and 23, interconnected in light-tight relation except for intercommunicating apertures intended to pass selected radiation. The first compartment 20 includes the light source 12 and the auxiliary gas-sample region 15; the second compartment 21 provides the liquid-sample testing region 16; the third compartment 22 provides the gas-sample region 17; the fourth compartment 23 encloses the monochromator 18. An auxiliary compartment section 19 in the compartment 22 includes the radiation detector 14. The compartment section 19 is sealed off from the remainder of the compartment 22 by means of walls 43 so that no radiation can reach the detector 14 without first passing through the monochromator.

Considering the path of radiation through the spectrophotometer, it is to be noted that the four compartments are provided with various windows which are registered on a straight-line path 25 extending through the four compartments and along which the radiation travels. More particularly, heterogeneous radiation diverging from the source 12 is transmitted to a concave mirror 28 at one end of the path 25 in the auxiliary gas-sample testing region 15. This mirror reduces the divergence of the radiation and reflects it as a beam along the path 25. The reflected radiation is collimated by a negative lens 30 and projected through an exit aperture 32 of the compartment 20 and an entrance aperture 33 of the liquid-sample compartment 21, and thence through an exit aperture 35 thereof and into the gas-sample compartment 22 through an entrance aperture 36 of the latter. It is to be noted that the radiation projected through the liquid-sample compartment is collimated throughout the portion of its path in that compartment. This enables the insertion of a liquid, or solid, sample in this portion of the path without disturbing the over-all focusing effects of the optical system between the source 12 and the entrance slit of the monochromator. It also permits insertion of alternative compartments of various lengths in place of compartment 21 without seriously altering these focal adjustments, with the advantage that a great variety of absorption cells or other devices as required by the user may be provided in this compartment.

Upon entering the gas-sample compartment 22, the collimated beam is directed by a positive lens 38 along converging paths so as to concentrate upon an entrance slit 40 of the monochromator 18, the radiation being transmitted thereto along a path passing above the walls 43 of the compartment section 19 and through an exit aperture 44a of the gas-sample compartment 22, and through an entrance aperture 45a in the monochromator. The radiation passing through the entrance slit 40 of the monochromator continues along the path 25 to a concave mirror 46, which reflects the radiation to a dispersing system of the Littrow type including a 60-degree rock-salt prism 48 and a rotatable flat Littrow mirror 50. A positive lens 52 arranged between the exit aperture 44a of the gas-sample testing compartment and the entrance aperture 45a of the monochromator focuses an image of the entrance aperture 36 of the gas-sample compartment 22 upon the aperture stop 54 defined by mask 55, shown in section, at the front face 56 of the prism 48.

The beam which enters the front face 56 of the prism is refracted toward the base 57 thereof and emerges from the rear face 58 of the prism being again refracted along the line directed toward the Littrow mirror 50. Because of the dispersion characteristics of the prism, components of the radiation of different wavelengths emerge from the rear face 58 of the prism in different directions. That radiation having such a wavelength that it travels substantially perpendicularly to the Littrow mirror is reflected thereby along a reverse path. This reflected beam enters the rear face 58 of the prism, emerges from the front face 56 thereof, traveling rearwardly to the concave mirror 46 and thence rearwardly along but somewhat below the path 25 toward an exit slit 60 which is located immediately below the entrance slit 40 when viewed as in Fig. 1. The arrangement of the optical elements of the spectrophotometer is such that reflected radiation of a central wavelength within the selected wavelength band arriving at the exit slit 60 forms there an image of the entrance slit 40, so that most of the radiation of predetermined wavelength travels outwardly of the monochromator along a path which is displaced vertically downward from the entrance slit 40 as mentioned. Radiation of other wavelengths travels generally toward the exit slit 60 along displaced paths, the optical arrangement of the monochromator being such that radiation of different wavelengths is focused at different positions in an approximately plane surface which passes vertically through the slits 40 and 60 and lies generally transverse to the beam path 25. The exit slit 60 thus serves to select a narrow wavelength band from the spectrum which is focused upon that surface in a dispersed manner as regards its wavelength. It is to be understood in this specification that where reference is made to selected radiation or to radiation of a selected wavelength, actually radiation in a selected wavelength band having its center at about the wavelength in question is intended. In the usual case this band is very narrow and is defined primarily by the widths of the entrance and exit slits 40 and 60 of the monochromator, and the dispersing characteristics of the prism.

This selected energy travels along a path beneath the lens 52 and outwardly of an exit aperture 45b located in the monochromator compartment directly beneath the entrance aperture 45a and thence through an aperture 44b in the compartment section 19 directly beneath the aperture 44a. The selected radiation entering the compartment section 19 travels to an inclined flat mirror 62 in the compartment section. This mirror 62 reflects the selected radiation toward a concave mirror 64 which in turn concentrates the radiation in the direction of the radiation detector 14 and, in conjunction with lens 65, forms an image of the exit slit, much reduced in size, on the photo-detector 14.

It is to be noted that the gas sample portions of the optical path are in regions where the beam is converging or diverging, and where any marked alteration of the effective optical path length would require refocusing of the optical elements for optimum performance. On the other hand, in the portion of the optical path adapted to accommodate liquid or solid samples the beam is collimated, that is, in the condition in which even after a relatively marked alteration of effective path length a readjustment of the focus will not increase the intensity of the radiation focused in the plane of the entrance slit. The image of the source in the plane of the entrance slit may be, and desirably is, larger than the entrance slit, so that small changes of focus in the optical path have negligible effect on overall instrument performance. Further, the effect of varying the optical path in the collimated region aforesaid is only to alter the position of the solid angles over which the radiation from the source is used, and not their magnitude or the size or intensity of the image of the source.

It will be noted that the length of the optical path in the liquid-sample region 16 is relatively short, but may readily be made longer by substitution of alternative compartments of various lengths, and this without requiring refocusing; while the path in the gas-sample region 17 or the auxiliary gas-sample cell region 15 is long and not readily varied in length without profound alteration of the design. In this connection it should be understood that, ordinarily, equal lengths of a liquid or solid sample and of a gas sample will produce widely different shortening of the geometrical optical path therethrough, the liquid or solid sample having much the more profound effect, as indicated by the large divergence of its refractive index from unity. We prefer to place gas-sample testing means in diverging and converging regions of the beam. Furthermore, ordinarily, liquid samples absorb much more radiation than gas samples of equal path length. We find it advantageous to use a relatively long gas sample and a relatively short liquid sample in studies of the spectral absorption characteristics of each.

Several advantages therefore result from the orientation of the sample handling means relative to the focusing means in this instrument: it is optically efficient under all conditions of use; it is versatile, yet relatively small and compact; and lastly, it is flexible in the sense that it is easily adapted to uses not specifically disclosed herein.

To facilitate analysis of liquid samples, a liquid-sample holder 66 having two liquid-sample cells 68a and 68b is located in the liquid sample compartment 21. This holder 66 is arranged to be transversely movable by means of a first manually-controllable operating rod 70 that extends through the wall of the compartment 21, so that either of the liquid-sample cells alone may be positioned on the path 25 to intercept the collimated beam or so that both sample cells may be withdrawn from the beam completely, if desired, as will be later described in more detail.

In a similar manner, a gas-sample holder 72 having two gas-sample cells 74a and 74b is located in the gas-sample compartment 22. The latter holder is likewise arranged to be shifted by means of a second manually controllable operating rod 76 that extends through the wall of this compartment, so that either of the gas-sample cells alone may be positioned on the path 25 to intercept the non-collimated beam and so that both of these sample cells may be withdrawn from the beam completely, if desired, as later described in greater detail.

Like liquid samples, solid samples also affect the effective optical path length profoundly. To avoid such effects when analyzing solid samples, these samples are introduced into the path of the beam within the "liquid"-sample compartment 21 where the beam is collimated, this chamber therefore serving in general for the analysis of non-gaseous samples.

In order to attain maximum sensitivity of this spectrophotometer throughout its range, the source 12 is of the incandescent type, preferably a Nernst glower, and is operated at a temperature of about 1,500° K., or higher. With such a source the distribution of energy in the spectrum of the source is very uneven, a large portion of the energy being concentrated in the short-wavelength region, and a relatively small portion of the energy being concentrated in the long-wavelength region. The proportions vary considerably with temperature and kind of source employed, but the principles of operation described apply to most commonly used sources in some wavelength region of use. In the graph of Fig. 3, curve A represents the spectral distribution of such energy at a temperature of 1,500° K. In this graph, the practical limits of the rock-salt region of the infra-red, namely, the region from about $1.0\mu$ to about $15\mu$, are indicated by heavy dashed lines $a$ and $b$ respectively. It is to be noted that the radiation intensity is relatively high in the short-wavelength portion of the spectrum and relatively low in the long-wavelength portion thereof.

While this spectrophotometer is designed to direct radiation of one predetermined wavelength to the detector at a time, in practice it is found that radiation of other wavelengths, known as false energy radiation, also arrives at the detector simultaneously. The presence of such false energy radiation at the detector results from multiple scattering and reflection of radiation of all wavelengths in its passage through the instrument. In an instrument in which the dispersing element is a diffraction grating, false energy may also result from overlapping of images from other spectral orders than the one desired at the exit slit. Because of the fact that there is little, if any, spectral discrimination in the multiple scattering and multiple reflection process, the spectrum of the so caused stray radiation falling upon the detector possesses about the same energy distribution as the spectrum of the radiation emitted from the source. Because of this relationship, the ratio of false energy radiation to selected energy radiation falling upon the detector when radiation of relatively short wavelength is directed thereto by the monochromator is very small, and in fact negligible for most practical purposes. However, in the long wavelength portion of the spectrum, the proportion of the false energy falling upon the detector is considerable. In Fig. 3, curve B represents graphically the manner in which the percentage of false energy in the total radiation falling upon the detector varies with the wavelength of the selected radiation. From this curve, it will be noted that the percentage of the radiation falling upon the detector which is false energy begins to be appreciable at about 6 to 8μ and rises rapidly above about 9-10μ, exceeding 10% of the total energy at 15μ.

The curves represented in Fig. 3 apply when the distribution of radiant energy is of the character indicated by curve A and the sensitivity of the photo-detector employed and also the reflection and transmission coefficients of various optical elements employed in the spectrophotometer are substantially uniform over the range of wavelengths in question. More accurately, curve A actually represents the products of the intensity of the source and the sensitivity of the detector and the transmission and reflection coefficients of those optical elements at each wavelength. It will be apparent that false energy effects may occur under other conditions. For example, it is apparent that a false energy curve having the same shape as curve B would result if a radiation source having substantially uniform distribution of energy were available and employed but the radiation detector had a sensitivity versus wavelength response characteristic represented by curve A. Though the origin of the stray energy effects may vary according to conditions, these effects may be minimized in accordance with the principles of this invention.

In this spectrophotometer, the effects of such stray radiation are minimized throughout the entire spectral range of the instrument, by means of a compound shutter mechanism 86 of Fig. 1 which comprises two shutter means which are selectively operable to periodically interrupt the flow of radiation through the spectrophotometer. This shutter mechanism includes a first shutter 88 comprising a semi-transparent, or filter, sector 89 and a second shutter 90 comprising an opaque sector 91 as will be later described in greater detail. As will be seen hereinafter, the first shutter 88 rotates alone as a first shutter means and the two shutters 88 and 90 rotate together as a second shutter means for interrupting the beam.

The opaque sector 91 is adapted to cut off the transmission of radiation from the source completely throughout the entire wavelength range of the instrument, when it is interposed in the path of the beam.

The semi-transparent sector 89 is in the form of a light, or radiation, filter having a cut-off at about the wavelength at which the precentage of stray radiation detected is no longer negligible, this sector being substantially completely transparent in the short-wavelength portion of the rock-salt region and substantially opaque in the long-wavelength portion of the rock-salt region. The semi-transparent sector 89 is therefore adapted to cut off radiation in the long-wavelength portion of the spectrum when it is interposed in the path of the beam, without interfering greatly with the transmission of radiation in the short-wavelength portion of the spectrum. In practice, the intensity of the radiation in the short-wavelength portion of the spectrum is reduced a little by the semi-transparent sector 89 because of the reflection of some of the short-wavelength radiation from the surfaces of this sector. A filter having a suitable characteristic may be composed of glass having a spectral transmission characteristic such as that represented in curve C of Fig. 3. This particular filter has a relatively sharp cut-off at about 7μ and has a high transmission coefficient of about 90% below about 4μ and a very low transmission coefficient usually less than about 1%, above about 9μ. Reflection losses in the short-wavelength region may be reduced by use of anti-reflecting coatings or otherwise compensated for as more fully explained hereinbelow.

In the present design, the semi-transparent shutter sector 89 is mounted directly upon a shaft 93 driven by a synchronous motor 95 and the opaque shutter sector 91 is arranged upon the shaft 93 so that it may be selectively registered with the first sector 89, so as to rotate with it only when operatively engaged therewith by means of a clutching mechanism 97 or so that it may be held stationary in an inoperative position when it is disengaged from the first sector by release of the clutching mechanism. A third manually-controllable operating rod 98, which extends through the wall of the source compartment 20, is used for manipulating the clutching mechanism 97.

The shaft 93 is arranged adjacent the source 12 and parallel to the path 25 so that when the two sectors are disengaged, the sector 89 of the first shutter 88 alone interrupts the beam at regular intervals, thus periodically varying the rate of flow of radiation at a predetermined frequency in only the long-wavelength portion of the spectrum, while at the same time the intensity of short-wavelength radiation falling thereon remains substantially constant. On the other hand, when the clutch is engaged so that the two sectors rotate in register, they constitute a second shutter means which periodically varies the flow of radiation of all wavelengths from the source to the detector.

In this specification where reference is made to substantial constancy of intensity of false energy, it is to be understood that the meaning intended connotes that the intensity of such energy does not vary substantially at the fundamental frequency at which the selected radiation varies.

In order to obtain a series of spectral measurements throughout the entire region of the spectrum, which is free of false energy effects, the spectrum is scanned by slowly rotating the Littrow mirror 50 so as to sweep the spectrum past the exit slit 60, thus causing energy of different selected wavelengths to be focused upon the radiation detector successively. The two shutter sectors 89 and 91 are engaged while the short-wavelength portion of the spectrum is being scanned, and the resultant periodic variation in intensity of radiation falling upon the detector is measured. This periodic variation in intensity is a measure of the amount of selected short-wavelength radiation being transmitted to the detector, because in this portion of the spectrum the quantity of false energy radiation also falling upon the detector is negligible.

When scanning the long-wavelength portion of the spectrum, the shutters 88 and 90 are disengaged so that at this time only the semi-transparent sector 89 interrupts the beam, thus causing the intensity of radiation falling upon the detector to vary periodically in proportion only to the intensity of the radiation of selected long wavelength being directed thereto, since the flow of false energy radiation to the detector at this time is substantially constant while the flow of long-wavelength radiation is periodically interrupted. Under these conditions, the variation in intensity of radiation falling upon the detector at each wavelength is measured to give an indication of the intensity of the selected radiation alone throughout the entire spectrum, free of any of the detrimental effects ordinarily arising from the presence of stray radiation.

It will be evident that the invention can be applied wherever apparent stray radiation is troublesome and it is possible to provide filters which can preferentially attenuate the selected radiation in a distinctive manner from the stray radiation and which can be incorporated into a beam-interrupting shutter mechanism. This is true regardless of the wavelengths and intensities of the selected and stray radiation and of the manner of transmission of the stray radiation from the source to the detector.

Operation in general

A chemical mixture containing a plurality of chemically different components is readily analyzed by utilizing such measurements in the long-wavelength range either alone or in combination with measurements in the short-wavelength range of the instrument. According to one method of the present invention, a sample of the mixture and samples of each of the pure components are successively disposed in the path of the radiation transmitted from the source to the detector. If liquid or solid samples are being tested, they are inserted in the portion of the path in the liquid-sample test region where the beam is collimated. If gas samples are being tested, they are usually inserted in the gas-sample test region in an uncollimated portion of the beam. In any case, a series of measurements at different wavelengths is made on each of the samples to determine the quantity of radiation transmitted through each of the respective samples at each of the wavelengths in question by the processes hereinabove described. The intensities of such radiation transmitted to the detector may also be determined with no sample whatever disposed in the path of the beam, in order to determine the proportion of such radiation absorbed by each of the samples at the respective wavelengths. The data so obtained for the mixture and for the components are then analyzed mathematically in order to determine the proportion of each component present in the mixture. The details of such a computation for a simple case may be illustrated as follows:

Suppose that a two-component liquid mixture is to be analyzed containing liquid components A and B. Suppose further, in order to simplify the illustration, that these components are of such nature that when they mix, the partial volume of each in the mixture is the same as the volume that each component would occupy alone in the pure state. And suppose further, that Beer's law holds for mixtures of these components, that is, that each component absorbs radiation only in accordance with the quantity of that component present and in proportio to an exponential function of the amount of that component present in a given volume. Suppose also that each of these components absorbs a substantial amount of radiation in the long-wavelength region of the spectrum, say at $13\mu$, but that their absorption coefficients are different. Then the intensity of radiation transmitted through the mixture at $13\mu$ is related to the intensity of radiation transmitted through equal volumes of the components at $13\mu$, in accordance with the following relationship:

$$\log \frac{1}{T_m} = X_a \log \frac{1}{T_a} + X_b \log \frac{1}{T_b} \quad (1)$$

where $T_m$ = transmission coefficient of radiation through measured length of the mixture at $13\mu$;
$T_a$ = transmission coefficient of radiation transmitted through an equal length of component A at $13\mu$;
$T_b$ = transmission coefficient of radiation transmitted through an equal length of component B at $13\mu$;
$X_a$ = fraction of component A in the mixture; and
$X_b$ = fraction of component B in the mixture.

In the above tabulation the transmission coefficients are given as the ratio of the intensity of the radiation which is transmitted through the sample compared to the intensity of radiation transmitted to the detector with no sample present at the wavelength in question. Because of the partial volume law in this instance, another relationship holds, namely:

$$X_a + X_b = 1 \quad (2)$$

Equations 1 and 2 may be solved simultaneously for the proportions of the components A and B present in the mixture, having at hand the measurements of the proportions of the radiation transmitted through the mixture and through the individual components at $13\mu$.

In ordinary methods of spectrometry, the computation of the composition of the mixture is complicated by the fact that the intensity of radiation cannot be directly measured because of the presence of stray radiation. However, in making analyses of mixtures in accordance with the present invention, this difficulty is overcome by varying the intensity of radiation striking the detector in proportion only to the quantity of the selected radiation of predetermined wavelengths transmitted thereto and measuring only this variation.

It is to be noted that in the example of spectro-chemical analysis given above, a two component mixture can be analyzed by measurements made at only one wavelength. Similarly, a mixture having N components may be analyzed by making measurements at N—1 wavelengths, if the law of partial volume and Beer's law referred to are obeyed. In the event that variations from these laws are present, additional measurements may be required such as measurements at additional wavelengths, in order to accomplish the desired analysis. In any event, it is to be understood that the method of analyzing chemical mixtures, may be varied in many different ways according to circumstances while still utilizing the principles of this invention and that the method is equally applicable to solid and gaseous samples as well as liquid samples.

Electrical circuits

In order to measure the intensity of radiation of a selected wavelength falling upon the radiation detector 14, the output of the detector 14 is preferably applied to an amplifying unit 100 which discriminates between the D. C. component of the detector output and the pulsating component therein. This discrimination may be obtained most readily by connecting the detector 14 in the input of the amplifying unit through a coupling condenser 101. In practice this coupling condenser is mounted within the compartment 22 adjacent the detector 14 together with the various electrical circuits represented by the symbol 101a associated with the detector. Such circuits include power supplies, transformers, and like elements.

In practice the amplifying unit 100 is designed to be selectively responsive to input signals having the same frequency as the frequency of beam interruption. This amplifying unit may comprise, for example, a tuned alternating-current amplifier 102, an attenuator 103, a rejection filter 104 and a second tuned alternating-current amplifier 105 connected in tandem.

The amplifier 102 serves to increase the strength of the signal immediately. The attenuator 103 is connected in the output of the amplifier and is variable so that it may serve to reduce the strength of the amplified signal to any desired level. The rejection filter 104 is preferably of a type which suppresses signals of any particular undesired frequency that may be present, such as signals picked up from a neighboring power line. Normally power-line frequency is 60 cycles and in this case the rejection filter desirably has an absorption peak at 60 cycles. The second alternating-current amplifier 105 is connected in the output of the rejection filter. Inasmuch as these amplifiers amplify only the varying component of the current or voltage generated by the detector in response to the radiation falling thereon, they produce at the output an approximately sinusoidally-varying alternating-current signal having the same frequency as the beam-interruption frequency. This signal has an amplitude proportional to the intensity of selected radiation focused upon the detector, even though large proportions of non-interrupted false energy radiation from various sources may be falling on the photo-detector.

The amplified voltage appearing at the output of the amplifying unit 100, is then rectified by means of a full-wave mechanical rectifier 108 operated in synchronism with the shutter mechanism 86 to produce a unidirectional current which is then impressed upon the input of a variable period-control circuit 110. In effect, the over-all amplification factor of the entire amplifying means including both the amplifier unit 100 and the variable-period control circuit 110, is periodically reversed in sign by this rectifier at the frequency of beam interruption. The direct-current signal appearing at the output of the variable period-control circuit 110, may be selectively impressed upon an indicating circuit 112, or upon an automatic recorder 114 by manipulation of a two-pole double-throw selector switch 116.

*Rectifier*

Considering the rectifier 108 in more detail and referring particularly to Figs. 2 and 5 in addition to Fig. 1, it will be noted that the rectifier 108 is provided with two pairs of contacts 118 and 120 which are opened and closed alternately by means of a cam 122 in the form of an eccentric disk mounted upon a motor shaft 124 attached to the shutter shaft 93 by means of a phase-adjusting coupling 126. The alternating-current amplifier 105 preferably has a balanced push-pull output having a central output terminal 127 and two oppositely phased upper and lower output terminals 128 and 129 respectively. The two pairs of contacts 118 and 120 are connected between the respective outer terminals 128 and 129 and the upper input terminal 131 of the variable period-control circuit 110. The central output terminal 127 of the alternating-current amplifier is connected to the lower input terminal 132 of the variable period-control circuit. With this arrangement, full-wave rectification of the output of the alternating-current amplifier 105 is attained, and the double series of rectified pulses is applied to the variable period-control circuit.

For optimum results, the opening and closing of the two pairs of contacts 118 and 120 is synchronized with the operation of the shutter structure 86, taking account of phase changes in the amplifier unit 100, the opening and closing preferably occurring simultaneously with the reversal in sign of the fundamental frequency component of the voltage appearing at the output of the amplifier unit. This fundamental frequency, in cycles per second, is equal to the speed of the shaft, in revolutions per second when using a shutter of the type described. The phase-timing of the opening and closing of these contacts, may be adjusted by means of the adjustable coupling 126 between the motor shaft 124 and the shutter shaft 93, as more fully described hereinbelow.

By phasing the operation of the mechanical rectifier in the manner described, the signal-to-noise ratio attains the maximum value of which it is capable with the circuit elements involved.

With the adjustment described, the rectifier responds only to odd harmonics of the shaft-speed frequency. The latter may conveniently be an even submultiple of the A. C. line frequency, thus giving a marked degree of discrimination against frequency components at harmonics of the A. C. power-line frequency which may be introduced from the power supply into the amplifier either by magnetic pick-up from stray fields or by microphonic elements in the circuit responding to vibration from electrical machinery and the like. A further advantage of the mechanical rectifier is the linearity of its response even at low signal levels, in which respect it is considerably superior to conventional electronic rectifiers.

It is to be observed that the over-all amplification factor, or gain, of the entire amplifying system, including the amplifying means 100 and the rectifier 108 but not the period-control circuit 110, is varied periodically by reversing the sign of this amplification factor and full-wave rectification is obtained. The amplification factor referred to is the algebraic ratio of the output to the input. If desired, the amplifier gain could be periodically varied by the use of only a single-contact rectifier instead of a double-contact mechanical rectifier, in which event half-wave rectification would be obtained and some of the advantages of the invention retained. While the invention may be practiced by periodically varying the amplifier gain in some other manner as well, the use of a double-contact rectifier of the type described has been found to be particularly effective.

*Variable period-control circuit*

In the conventional practice of infra-red spectrometry, a galvanometer or galvanometer amplifier may be employed to measure the current from the photo-detector, which is commonly a compensated thermo-pile. As is well known, the damping behavior or time-response characteristic of a galvanometer may be altered in various ways to provide under-damped, critically-damped or over-damped response. Its response period is defined in the conventional manner as the time in seconds required for the instrument to complete one cycle of oscillation, following the abrupt introduction of a suitable quantity of electricity, when completely undamped. The period is usually fixed within narrow limits by the design and construction of the galvanometer.

We have provided, in this invention, means by which both the effective period and the damping of the indicating device used may be conveniently varied over wide limits and quite independently, to permit the selection of a response characteristic best suited to a particular type of operation, whether, for example, it be for rapid scanning of the spectrum or for maximum resolution of a single-wavelength region.

The variable period-control circuit 110, useful in this connection, is shown in detail in Fig. 2. It includes a cathode-loaded triode 135 having a grounded cathode resistor 136 in its output and two stages of resistance-capacitance filter in its input. The two ganged variable resistors 138 and 139 of these filters are connected in series, in the order named, between the upper input terminal 131 and the signal grid 141 of the triode. The condenser 142 of the first filter section is connected to a point between these two resistors and to a sliding contact 143 on the cathode resistor 136. The condenser 144 of the second filter stage is connected between the signal grid 141 and ground 145. The impedances of the resistor 139 and the condenser 144 are in the same proportion, but sufficiently greater than those of the respective elements 138 and 142 of the first section of the filter that the second section does not present such a load to the first section as would appreciably alter its frequency-response function. In practice, a factor of five or more is adequate for this purpose.

The lower input terminal 132 is connected to ground 145 through sliding contact 146 of a variable rheostat at 147, having a battery 148 connected across its terminals. This contact 146 may be adjusted to produce zero voltage at the output of the variable period-control circuit when no alternating-current signal appears at the output of the amplifier unit. The output of this circuit is taken across two terminals, the upper terminal 150 of which is connected to the cathode end of the resistor 136 and the lower terminal 151 of which is connected to the grounded end of this resistor through the zeroing rheostat 147 and a record-marking resistor 152.

One of the advantages of this circuit resides in the fact that simultaneous and proportioned variation of the impedance of resistors 138 and 139, or alternatively of capacitors 142 and 144, causes the effective high-frequency cut-off point of the entire period-control circuit 110 to change without substantially affecting the damping exhibited by an indicating device connected across its output. Also, the frequency above which signals are attenuated may be adjusted without affecting the over-all sensitivity of the amplifying means to the signals desired. Thus, this arrangement permits reduction of any high-frequency noise impressed upon the input of the variable period-control circuit without affecting sensitivity to slow changes as the spectrum is scanned. In practice, the cut-off frequency of the filter is established at a point considerably below the frequency of beam interruption, so that appreciable fluctuations at this frequency or important harmonics thereof do not appear in the output.

For purposes of later illustration, it will be assumed that normally the resistors 138 and 139 have three values corresponding to long, medium and short periods (i. e., low, medium, and high-frequency cut-offs respectively). All of these periods are relatively long compared to the interval between successive interruptions of the beam.

A further important advantage of the variable period-control circuit is that the effective damping of the response to a change of input signal applied across terminals 131 and 132 may be altered by adjusting the position of contact 143 on load resistor 136, from a strongly over-damped through a critically-damped, to a strongly under-damped condition. A partial compensation for possible undesirable characteristics of an indicating or recording device connected to the output terminals, and selection of an optimum response behavior is thus provided.

*Measurements of selected wavelengths*

It has been indicated above that the output of the amplifier means may be measured at individual wavelengths or may be automatically recorded over a wide range of wavelengths, by connecting either the indicator circuit 112 or the recorder 114 to the output of the amplifier means. Considering first the arrangement for measuring the intensity of radiation at selected wavelengths, when selected radiation of a predetermined wavelength is falling upon the detector 14, the two-pole double-throw switch 116 is moved to its upper position wherein the indicating circuit 112 is connected in the output of the amplifier means. This indicator circuit 112 includes a sensitive galvanometer 154, which may be selectively connected, by means of a three-pole switch 155, to the negative end of a balancing potentiometer 156 or to a sliding contact 157 of this potentiometer or to a fixed point of a voltage divider 159, the potentiometer and the voltage divider being connected in parallel across a source 160 of regulated direct-current voltage.

To illustrate the use of this indicating circuit, consider a case in which it is desired to measure the transmission coefficient of a sample at some wavelength in the long-wavelength portion of the range of the instrument, such as $13\mu$. First, while the radiation traveling from the source 12 to the detector 14 is intercepted by means of an opaque filter on the slide 286 of Fig. 6, the zeroing rheostat 147 is adjusted to nullify the current in the output of the period-control circuit 110, this being done with the switch 155 connected to the negative end of the potentiometer 156. Then while an empty or solvent-filled sample cell is located in the beam, the rotatable Littrow mirror 50 is set at a position corresponding to $13\mu$ and the galvanometer 154 is connected to the voltage divider 159. The instrument is then adjusted to bring the reading of the galvanometer 154 to the zero-current point. This is accomplished either by adjustment of the attenuator 103 or by adjustment of the slits 40, 60 in the monochromator 18 or both. When the output of the amplifier means has thus been balanced, it is known that the signal appearing at the output equals that corresponding to the voltage supplied by the voltage divider 159.

The meter 154 is then connected to the sliding contact 157 of the potentiometer 156 and the potentiometer adjusted to the point where the output of the amplifier means is balanced. The resistance of the potentiometer in the galvanometer circuit is measured or read from a calibrated scale associated with the potentiometer. Thereupon, a sample to be tested is inserted in the path of the beam. The potentiometer 156 is then balanced again against the output of the amplifier means, and the resistance of the potentiometer in the galvanometer circuit is again determined. The transmission coefficient of the sample may be calculated by dividing the resistance of the potentiometer included in the output circuit under the two conditions. It is to be noted that by utilizing the semi-transparent shutter in the manner hereinbefore described, the transmission coefficient thus calculated is not rendered inaccurate by the presence of any false energy radiation at the detector.

In practice, according to the present invention, the calculation of the transmission coefficient is made directly by means of a dial 161 that operates the sliding contact 157 of the potentiometer 156 as illustrated schematically in Fig. 4. The potentiomenter 156 is wound on the arc of a circle and the dial 161, which moves the sliding contact 157 relative to the resistive winding, rotates about the center of this circle. The dial is so calibrated that when the sliding contact is at the negative end of the potentiometer, the zero point on the dial 161 is located directly beneath an indicating pointer 162 and when the sliding contact is positioned at a point on the potentiometer to produce a voltage equal to that applied by the voltage divider 159, a 100% mark on the dial is located directly beneath the indicating pointer. Assuming a linear wound resistance, the dial is calibrated in equal steps accordingly.

Furthermore, a second scale, not shown, may be provided on dial 161 on which the result may be read directly in "optical density," which is defined as the logarithm of the reciprocal of the fractional transmission. This scale is convenient in practice because its reading is proportional to the concentration of any absorbing substance which follows Beer's law.

With this arrangement, once the sensitivity of the spectrophotometer is set to the point where the output of the amplifier means is balanced against the voltage supplied by the voltage divider 159, it is only necessary subsequently to balance the output of the amplifier means with the potentiometer with a sample in place and to read the percentage transmission of the sample directly upon the dial.

When making the adjustment referred to, the variable period-control circuit is manipulated to achieve the balancing action in a minimum time consistent with the accuracy desired. More particularly, the variable period-control circuit may be set at a short-period position during the initial stage of a balancing operation and at the long-period point in the final stage of a balancing operation. Thus, during the initial stage of balancing, the meter 154 responds to noise considerably, so that it fluctuates rapidly about the balance point. But because of the short time constant of the indicating circuit during this stage, the meter seeks its balance point rapidly, so that the apparatus may be manipulated rapidly to reach that balance point. In the latter stage of balancing the metering circuit has a long response period thus cutting out much of the higher frequency noise and permitting the pointer of the meter to remain relatively steady. During this stage of the operation, small slow adjustments may be made in the instrument to bring it to the proper balance point, thus permitting that balance point to be readily observed without being obscured by excessive noise.

Scanning and recording apparatus, in general

In order to scan the spectrum over an extended range and to obtain a continuous record of the spectrum over that range, the Littrow mirror 50 is rotated continuously over angles corresponding to that range by means of a linkage 165 (see Fig. 1) operated from a spiral cam 166 which is in turn driven by a synchronous motor 168, through a connecting gear train 169, as more fully described hereinbelow. The driving coil 170 of a recording pen 172 in the recorder 114 is connected to the output of the amplifier means by setting the two-pole double-throw switch 116 in its lower position. A record strip 174 is drawn beneath the pen at a constant rate by means of a second synchronous motor 176. In practice, the wavelength drive motor 168 is energized first and the recorder motor 176 is subsequently energized at the time when the mirror 50 is brought to a position corresponding to some predetermined wavelength at which it is desired to begin the recording.

The use of two synchronous motors, one for driving the scanning system in the monochromator 18 and one for driving the record strip 174 in the recorder 114, facilitates the coordination of measurements at various wavelengths in the recorded spectograms of different samples. This coordination is furthered by producing a series of marks on the spectogram or recording strip simultaneously with its recording at positions corresponding to predetermined wavelength settings of the Littrow mirror 50. This is achieved, for example, by periodic insertion of marking signals in the output of the amplifier means synchronously with the scanning of the spectrum. Such marking signals are created in the present instance by periodically inserting a voltage from a battery 177 (Fig. 2) in the output of the period-control circuit 110 by periodically closing a switch 178 (Figs. 1 and 2) with a notched cam 180 (Fig. 1) driven by the scanning motor 168.

With this arrangement small pips are added to the record at regular intervals during the recording. Since the positions of these pips correspond to predetermined positions of the spiral cam 166, they likewise correspond to predetermined wavelength settings of the Littrow mirror 50 and may, therefore, be readily used to facilitate the interpretation of individual spectrograms or the coordination of a series of spectrograms.

During a recording, the period-control circuit may be set at its long-period position to attenuate noise, thus minimizing the widening of the record line by random fluctuations in the output signal. The value of the period selected should be short compared to the time rate of percentage change of radiation intensity as the spectrum is scanned, but otherwise as long as possible to facilitate accurate recording. When the spectrum is scanned slowly a long period setting should be used and when scanning rapidly a short period setting may be used to produce a comparable record.

Source regulation

In order further to stabilize the operation of the spectrophotometer and further to attain accuracy in results, the intensity of the radiation emitted from the source 12 is regulated in accordance with the intensity of radiation appearing in a portion of its spectrum. To achieve this result, a variable impedance 182 is coupled by transformer 185 between the source 12 and the power supply line from which the source 12 is energized. This impedance is varied as an inverse function of the intensity of radiation emitted from the source, so that an increase in the intensity of such radiation causes a reduction in the amount of electrical power supplied to the source 12 and a decrease in the intensity of such radiation causes an increase in the amount of electrical power supplied to the source with the result that the intensity of radiation emitted is stabilized.

In the present instance this is achieved readily by means of a photoelectric cell 184 positioned to detect radiation in the relatively intense region of radiation emitted from the source 12. Such a cell may be of the type having its maximum response at about $0.8\mu$. The voltage output of the photoelectric cell 184 is applied to the input of an amplifier 186 whose output impedance varies inversely as the voltage supplied to the input. The output impedance of this amplifier is reflected into the power line in series with the source 12 by means of a transformer 185 to attain the desired stabilization.

To further increase the accuracy of the spectrophotometer, the walls of the various compartments are liquid cooled by means of liquid circulating through coils (not shown) from a constant temperature source. Also, to protect the rock salt optical elements from damage due to moisture in the air, suitable desiccators are placed at various points in the respective compartments.

From the foregoing description, it will be apparent that a spectrophotometer has been provided in accordance with the present invention which achieves a high degree of accuracy throughout its entire wavelength range and its entire intensity range.

Considering now the preferred construction and detailed arrangement of various parts of the spectrometer, reference is further made to Figs. 5 to 10, inclusive, which illustrate various features of the apparatus included in the source compartment.

*Source Compartment*

The source or lamp compartment 20 comprises an inner wall structure 201, in one corner thereof, which defines a chamber within which the light source 12 itself and the associated regulating photoelectric tube 184 are mounted. This compartment 20 also comprises a wall structure 202 forming a totally-enclosed auxiliary gas-test cell comprising the auxiliary gas-sample region 15 and having an entrance window 204 adjacent the light source 12 and an exit window 205 opposite the exit aperture 32 of this compartment 20. The concave mirror 28 is supported within this cell at the end thereof remote from the entrance and exit windows 204 and 205 in order to establish a long path over which radiation must travel within the cell between the two windows. The concave mirror 28 is adjustably inclined to the main beam path 25 in order to facilitate reflection of radiation from the source 12 along that path accurately. The entrance window is closed by an optically flat plate 209 composed of rock salt, which is transparent to radiation within the range of operation desired. The exit window 205 preferably carries the negative lens 30 in the form of a plano-concave lens composed of like material and which has such a focal length that the radiation emerging from the cell is collimated as a parallel ray beam.

With this arrangement, radiation diverging from the source 12 passes through an exit window 211 in the wall which encloses the source, thence normally through the plate 209 in the entrance window 204 to the concave mirror 28 which serves to reflect the radiation along the desired path 25 and to bring it to a virtual focus on the far side of the exit window 205. The reflected radiation converging upon the exit window is collimated by the lens 30 to produce the desired plane beam.

*Shutter mechanism*

The compound shutter mechanism 86 is arranged within the compartment 20 so that its sectors may intercept the beam as they rotate, e. g., these sectors may be interposed between the exit window 211 and the plate 209. The first shutter 88, which comprises the semi-transparent or filter sector 89, is in the form of a wheel 212 (Figs. 7 and 9) mounted directly upon the end of the shaft 93 which in turn is supported in a bearing 214 clamped at the upper end of an upright member 216 rigidly secured to the floor 217 of the compartment 20.

The shutter wheel 212 comprises three radial spokes 218, 219, and 220 arranged between a central hub 221 and an outer ring 222. Two of the spokes 218 and 220 are arranged in approximately diametrically opposite positions and the remaining spoke 219 is located at right angles thereto. The filter sector 89 is of semi-annular shape covering 180° of the wheel area and is supported at its ends by the diametrically opposite spokes 218 and 220 and at its inner and outer edges by the hub 221 and the ring 222 respectively. The shutter is so proportioned that the openings between the spokes provide windows through which the beam is projected from the source to the concave mirror 28 as the shutter 88 rotates with the shaft 93, the dimensions being determined by considerations described hereinafter. By properly proportioning the dimensions of the spokes and their windows in relation to the area and reflection coefficient of the filter 89, detrimental effects of false energy radiation may be minimized as hereinbelow fully explained.

While the particular shutter 88 just described in detail serves to minimize effects of false energy radiation very effectively, other types of shutter structures may also be used for this purpose. For example, residual detrimental effects due to reflection of energy having wavelengths of false energy at the surfaces of the filter sector 89 may be reduced considerably by applying coatings or layers of anti-reflecting coating material of suitable thickness to these surfaces. Such a material, for example, might comprise magnesium fluoride. As is well known, the thickness of such a layer (taking due account of the index of refraction) is ideally one-fourth of the wavelength of the radiation which it is desired to transmit without reflection and the property of reducing reflection losses extends over a band on both sides of that wavelength. In the present instance, optimum results may be achieved by applying a coating having a wavelength which is about one-fourth of the wavelength at which the maximum intensity of radiation occurs in the source.

In another alternative method of minimizing the effects of false energy radiation, the shutter 88 may be constructed with two substantially semi-circular elements, one of said elements being composed of a material, such as glass, adapted to attenuate selected radiation and to transmit false energy radiation, the other element being composed of a material, such as rock salt or potassium bromide or tellurium iodide, adapted to transmit both selected radiation and false energy radiation without substantial attenuation. In this case, the reflection losses at the surfaces of the first element are equalized by those at the surfaces of the second element. In a shutter using two such elements, two diametrically opposed spokes may be included between the two elements in order to provide a shutter structure of sufficient strength.

If it is desired to operate at still longer wavelengths, other materials may be used effectively. For example, false energy effects may be eliminated in a range between $20\mu$ to $25\mu$ by use of a two-element shutter of the type described, rock salt being used as the filter element to attenuate the selected long-wavelength radiation and potassium bromide being used as the element which transmits both the selected radiation and the short-wavelength false energy radiation.

From the foregoing discussion, it is clear that the first shutter 88 may be constructed in many different ways to achieve the advantages of our invention, and that our invention may be applied in many different wavelength ranges by proper selection of materials for the shutter elements.

The second shutter 90 comprises the opaque sector 91 which may be a semi-annular sector supported upon a hub 223 which is journalled on the shaft 93 in the space between the upright member 216 and the shutter wheel 212. The outer cylindrical surface 225 of this hub 223 is frictionally engaged by a felt pad 226 urged toward this surface by a compressed helical spring 227, the felt pad 226 and the spring 227 being arranged within a bore 228 in a horizontal member 230 extending transversely from the upright member 216 towards the shutters.

The hub 223 of the second shutter is provided with a countersunk bore 232 extending therethrough in a direction parallel to the shaft 93, the enlarged portion of the bore being on the side of the hub remote from the shutters. A clutching and registering pin 234, having a head 235 thereon between the hub 223 and the upright member 216, is normally urged along this bore toward the wheel hub 221 by means of a helical spring 236 compressed between a collar 238 on the pin and a threaded ring plug 239 screwed into the hub 223 at the outer side of the enlarged portion of the bore 232.

The clutching and registering action of this pin 234 is accomplished with the cooperation of a U-shaped spring 241 best shown in Fig. 9. The arms of this spring are radially arranged upon the wheel hub 221 adjacent the hub 223, the arm of the spring at the trailing side thereof being rigidly secured to the wheel hub 221. With this arrangement, when the pin 234 is withdrawn, it disengages the leading arm of the spring 241. The second shutter 90 and its opaque sector 91 are then held stationary by the felt pad 226 even though the first shutter 88 continues to rotate. However, when the pin is moved into its home position during the rotation of the first shutter 88, the leading arm of the U-shaped spring 241 engages the end of the pin 234 and pushes the second shutter around with the first shutter. The pin 234 is held snug against the leading arm of the spring 241 by means of the frictional drag of the felt pad 226 upon the hub 223 of the second shutter.

The engagement and disengagement of the two shutters is accomplished by means of a pivoted clutching arm 242 which is movable between extreme positions determined by adjustable limit stops 244a and 244b. This movement is accomplished by means of a link 243 pivoted to the clutching arm 242 and controlled by means of the operating rod 98 operatively connected to the link.

This clutching arm 242 is held tightly in either of the extreme positions by means of a toggle mechanism 245 comprising a barrel 246 pivotally supported on a short upright member 247. A plunger 248 operates in the barrel and is normally urged outwardly by a helical spring 249 enclosed in the barrel 246 to force a pin 250 on the end of the plunger against the wall of a hemispherical recess at the lower end of the clutching arm 242. This toggle mechanism 245 serves to push and hold the clutching arm 242 against one limit stop 244a or the other 244b according to which side of its neutral position the clutching arm 242 is moved. One stop 244a is so positioned that the clutching arm 242 is completely removed from the pin 234 so as to permit the two shutters to rotate together without interference from the clutching arm when the pin 224 is in its home position. The other stop 244b is so positioned that the head 235 of the pin is guided to engage a shoulder 252 on the clutching arm in the other position as follows: When the clutching arm is moved from the first stop 244a to the second stop 244b while the shutters are rotating together, the head 235 of the pin engages an inclined surface 253 of the finger 254 and rides therealong to the shoulder 252, thus withdrawing and disengaging the pin 234 from the clutching spring 241. Upon such disengagement, the second shutter is held stationary in such a position that its shutter sector 91 is withdrawn from the beam, so that the beam is thereafter interrupted periodically only by the first shutter 88.

Conversely when the clutching arm 242 is moved from the second stop 244b to the first stop 244a during the rotation of the shaft 93, the pin 234 is released by the clutching arm and its end forced by the spring 236 against the hub 221 of the first shutter 88, whereupon it becomes engaged by the clutching spring 241 during the rotation of the first shutter thereby picking up the second shutter 90 and rotating it with the first shutter 88. In practice, the clutching spring 241 is located upon the first shutter 88 in such a position in relationship with the location of the pin 234 on the second shutter 90, that when the two shutters are engaged, the sector 91 of the second shutter lies directly over the filter sector 89 of the first shutter. In effect, the two sectors then operate together as one opaque sector and the two shutters comprise a second shutter means which periodically intercepts the entire beam.

The synchronous motor 95 which drives the compound shutter 86 is mounted within a separate and externally-opening chamber defined by suitable wall structure 256 (Fig. 6). The motor shaft 124 is journalled in this wall structure and is connected to the shutter shaft 93 by means of the angularly adjustable coupling 126. The adjustable coupling includes two coupling members 258 and 259 which are rigidly secured to the respective shafts 93 and 124 by means of set screws 261 and 262, as indicated in Fig. 10. One of the coupling members 258 includes a cylindrical recess 263 into which a hub 264 on the other coupling member 259 is inserted to enable the two coupling members to be rigidly secured together by means of a set screw 265. With this coupling 126, the opening and closing of the switch contacts 118 and 120 may be time-phased with the rotation of the shutter by relative angular adjustment of the two coupling members 258 and 259.

Referring to Fig. 5, it is to be noted that the rectifier 108 includes a cross-member 265 which is suitably supported from the wall of the compartment and in a horizontal position above the motor shaft 124 and transversely thereof. Two stationary arms 267 and 268 depend from this cross-member intermediate its ends and two pivoted arms 269 and 270 of channel cross-section depend from the outer ends thereof. The latter arms carry insulating fingers 272 and 273 at the outer ends thereof which are urged against the periphery of the disk cam 122 by means of a coil spring 275 adjustably attached to these two arms intermediate their respective ends. Adjustable stationary contacts 278 and 279 are arranged upon the two stationary arms 267 and 268 and two fixed contacts 281 and 282 are arranged upon the two outer arms 269 and 270. The two pairs of contacts 118 and 120 thus provided are adjusted so that each remains open and the other remains closed during alternate half rotations of the shaft 124. The contacts 281 and 282 on the two outer arms are connected to oppositely poled output terminals 128 and 129 of the alternating-current amplifier 105 and the two contacts 278 and 279 on the intermediate arms are connected to the upper input terminal 131 of the variable period-control circuit as illustrated in Fig. 2.

*Operation of periodic shutter mechanism*

Considering now in detail the operation of the shutter arrangement illustrated in Figs. 7, 8, and 9, while the first shutter rotates alone, each of the spokes 218, 219 and 220 then intercepts the beam projected through the spectrophotometer once during each revolution. Each spoke intercepts only about half the beam and thus reduces the intensity of the radiation to about half its maximum value in all portions of the spectrum at that time. Also, in each revolution, the filter sector 89 intercepts the beam and transmits substantially all short-wavelength radiation therethrough except for the losses due to reflection at the surfaces, while at the same time attenuating long-wavelength radiation very highly. As a result, the total radiation intensity at the detector 14 varies periodically at the frequency of shutter rotation, but is never shut off completely while selected radiation of long wavelengths is focused thereon. By suitably proportioning the areas of the spokes in relationship to the area and the degree of transparency of the filter sector to short-wavelength radiation, the average amount of short-wavelength radiation reaching the detector during each half rotation of the shutter is the same, but the amounts of the long-wavelength radiation reaching the detector are different. As a result, the component of intensity variation at the detector having the same frequency as the frequency of beam interruption is of an amplitude proportional to the intensity of the selected long-wavelength radiation being focused upon the detector. By measuring only this component, as hereinbefore mentioned, undesirable effects otherwise arising from the presence of false energy radiation are eliminated.

The manner in which the intensity of radiation passing the shutter and reaching the detector varies with time during the rotation of the first shutter is illustrated diagrammatically in Figs. 11 and 12, the variations during two successive cycles of operation being illustrated. In Fig. 11, graph *a* represents the variation in the intensity of long-wavelength radiation transmitted past the shutter; and graph *b* represents the variation in the intensity of the short-wavelength radiation transmitted past the shutter; and graph *c* represents the variation of intensity of the total radiation including both selected radiation and stray radiation actually reaching the detector 14. In these three graphs ordinates are indicated in percentage, 100% in graph *a* representing the maximum intensity of long-wavelength radiation, and in graph *b* the maximum intensity of stray radiation, and in graph *c* the maximum intensity of selected radiation striking the detector. Abscissae in these graphs represent time, and for convenience the time scale is indicated in degrees of angular rotation of the shutter. The instants of interception of the beam by the spokes 218, 219, and 220 and the filter sector 89 are indicated in the drawing at the bottom of Fig. 11.

Referring to graph *a* it is to be noted that the intensity of the long-wavelength radiation is about zero when the filter sector intercepts the beam and falls to about 50% when one of the spokes intercepts the beam, and reaches 100% when the beam is not intercepted by the filter sector or any of the spokes. Similarly, as illustrated in graph *b*, the intensity of short-wavelength radiation is 100% when the beam is not interrupted by the filter sector or the spokes and falls to about 90% when the filter sector intercepts the beam and to about 50% each time one of the spokes intercepts the beam. In graph *c* the combined effects of the variation of intensity of the selected radiation and the stray radiation is illustrated taking due account of the fact that the amount of stray radiation falling upon the detector is only a small fraction of the selected radiation falling upon it.

Considering a case in which selected radiation of 13μ is being directed to the detector and taking due account of the fact that the amount of stray radiation striking the detector at the time is about 5% of the amount of selected radiation striking it, it is to be noted that the total quantity of radiation striking the detector while the beam is not interrupted either by the filter sector or the spokes is about 105% of the intensity of the selected radiation alone and is about 5% of that intensity when the filter interrupts the beam. The total radiation intensity falls to about 50% when the middle spoke 219 interrupts the beam and to about 2½% at the time that the beam is interrupted by the end spokes 218 and 220.

In Fig. 12 graph *d* represents the variation of the component of selected radiation striking the detector at the fundamental frequency of beam interruption, the other components being unimportant because of the filtering characteristic of the amplifier 100 and synchronous rectifier 108 as previously described. Graph *e* represents the average flow of stray radiation to the detector taking into account the fact that the variation of intensity of stray radiation does not contain any substantial component of fundamental frequency. Graph $f$ represents the total variation in intensity of both the selected and stray radiation combined reaching the detector, neglecting the components at harmonic frequencies of the fundamental.

Graph $f$ accordingly illustrates the fact that there is an alternating component of fundamental frequency superimposed upon an average flow of energy composed of two components $I_1$ and $I_2$ to the detector. The first component $I_1$ represents the average flow of selected radiation to the detector and the second component $I_2$ represents the average flow of stray radiation to the detector. In view of the discrimination of the amplifying system against the average components, it is clear that the signal appearing at the output of the amplifier 105 varies sinusoidally with an amplitude which is proportional to the amount of selected radiation reaching the detector.

It is to be understood, of course, that the portions of selected radiation and stray radiation striking the detector at any time depends partly upon the wavelength of the selected radiation being directed to the detector at that time and also partly upon the absorption characteristic of any sample that is being analyzed. However, in any event, the principle of operation remains the same, the condenser and amplifying system cooperating with the shutter system to substantially eliminate all effects of stray radiation. Thus, when measurements are being made in the long-wavelength region of the spectrum as the first shutter rotates alone, the condenser 101 discriminates against the false energy reaching the detector in favor of variations in intensity of these selected radiations. At the same time, the amplifier discriminates in favor of variations in intensity of the selected radiation at the frequency of beam interruption.

In an alternative embodiment of the invention, a shutter arrangement is provided in which the filter sector is coated to reduce the reflection coefficient thereof to a negligible value, and no spokes are used in this shutter. In this case too, the component of the variation of radiation intensity at the detector when selected radiation of long-wavelength is focused thereon is proportional to the intensity of only the selected radiation.

When the two shutters are engaged and rotating together all of the radiation is periodically interrupted by the shutter sectors. With this arrangement, whenever selected radiation of short-wavelength is focused upon the detector, the intensity of radiation striking the detector varies at the frequency of beam interruption and with an amplitude proportional to the intensity of the short-wavelength radiation in question. When the two shutters are rotating together the variation in the intensity of radiation striking the detector is represented by graph $a$ of Fig. 11, there being no measurable amount of stray radiation present at this time.

In either event, whether the first shutter is rotating alone or the two shutters are rotating together in register as a single shutter means, the coupling 126 between the motor shaft 124 and the shutter shaft 93 is adjusted to such a position that one pair of contacts of the mechanical rectifier 108 opens and the other pair of contacts closes each time that the fundamental component of the current in the output of the alternating current amplifier passes through zero. As previously indicated such action results in improved sensitivity by increasing the signal-to-noise ratio and in improved linearity of response.

An auxiliary chamber 284 is arranged transversely of the beam path between the exit window 205 of the auxiliary gas cell 15 and the exit opening 32 of the source compartment 20 so as to enable the insertion and withdrawal of a filter 285 having any desired properties into the path of the beam. Such a filter may be so manipulated by being supported upon a slide 286 arranged at the inner end of a rod, or operating arm, 287 extending through the compartment wall. This filter slide also carries a completely opaque shutter 288 which is convenient for adjusting the zero control 146 of Fig. 2, as mentioned before.

Liquid-sample cells

Considering now the liquid-sample compartment, reference is made particularly to Figs. 13 and 14, wherein there is shown a liquid-sample holder 290 comprising two liquid-sample test cells 292 and 294 corresponding to the cells 68a and 68b, previously mentioned, either one of which may be selectively positioned in the path of the collimated beam between the entrance aperture 33 of the liquid-sample compartment 21 and the exit aperture 35 thereof. The liquid-sample holder 290 comprises a frame structure 296 having an upper cross-member 298 and a lower cross-member 299 interconnected by a central upright member 300 terminated at its upper end by a finger grip 301, by means of which the frame structure containing the cells may be removed from and arranged within the compartment 21. The lower cross-member 299 is supported at its outer ends by a pair of depending V-notched end plates 302 and 303 adapted to rest on a rod 304 extending lengthwise across the compartment transversely of and below the beam path. This rod provides front, intermediate and rear grooves 305, 305a, and 305b. When the front end plate 302 rests in the front groove 305, the cell 294 is disposed in the beam. When the end plate 302 rests in the intermediate groove 305a the cell 292 is disposed in the beam and when in the rear groove 305b, both cells are removed from the beam. The two notches 305 and 305a are so located upon the rod 304 that each of the liquid sample cells may be disposed in substantially identical positions in the beam. Below and to one side of the rod 304 is a rotatable arm 306 which may be slid into and from the liquid-sample compartment. This arm 306 is operated by a handle 307 and carries a platform 308 above the rod 304 which may be used to lift the sample holder from one position on the rod and move it to another position. A pin 307a extending from the upright member 300 rests against a smooth bearing surface on a fixed horizontally extending land 308a to aid in supporting the liquid-sample holder in a vertical position.

Each of the liquid-sample test cells comprises metal plates 309 and 310 (Fig. 14) having coaxial circular bores 311 and 312 therein. Between these plates 309 and 310 there are arranged an annular amalgamated lead gasket 313, a rear rock-salt window 314, an apertured amalgamated opaque spacer 315, a front rock-salt window 316, and a rubber gasket 317 in the order named. The foregoing elements are rigidly secured together by means of four screws 317a and are registered by means of alignment pins 317b extending through all of them. The aperture in the spacer 315 defines a liquid-sample chamber 318 between the two windows 314 and 316. This aperture is provided with an upper slot 319 which communicates through upper bores, in the rock-salt window 314 and the lead gasket 313, with a vertical adit bore 321 at the top of the plate 309. This aperture is also provided with a lower slot 320 which communicates through lower bores, passing through the rock-salt window 314 and the lead gasket 313, with a vertical exit bore 322 in the bottom of the plate 309. Upper and lower needle valves 324 and 325 are arranged in the adit and exit bores 321 and 322 respectively to facilitate filling and emptying the liquid chamber.

The cross-sectional area and the lengths and the shape of the two liquid-sample chambers 318 in the respective cells are made as nearly alike as possible and the windows of the different sample chambers are also made as nearly alike as possible in order to minimize corrections required in calculations from inequalities between the two cells.

Preferably, the cross-sectional area of the aperture of each cell, defined by the side wall of the spacer and the top and bottom portions of the plates, totally encloses the beam projected into the liquid-sample compartment so that the area of the beam transmitted through a liquid sample to the monochromator is independent of this area.

Each of the liquid-sample cells is clamped in the liquid-sample holder between a pair of upstanding pins 326 on the lower cross-member 299 and springs 327, extending transversely from the lower side of the upper cross-member 296.

This arrangement is capable of a wide variety of uses. For example, with this arrangement it is a relatively easy matter to make comparisons between liquid samples contained in different cells. Also, for example, in order to eliminate errors due to reflection losses at the interfaces between the liquid and the rock salt when a liquid sample under investigation is in one of the liquid-sample cells, a comparison run may be made with a sample of a non-absorbing liquid of about the same index of refraction in the other cell. Furthermore, both of the liquid-sample cells may be removed completely from the beam, when it is desired to make measurements of gas samples.

Gas-sample cells

Considering now the gas-sample compartment 22, reference is made particularly to Figs. 15 and 16, wherein is shown in detail the sample holder 72 comprising the two gas-sample testing cells 74a and 74b together with a mechanism for interposing either of the cells in the path of the beam to analyze gas samples and for withdrawing both the cells therefrom while non-gaseous samples are to be analyzed. The gas cells 74a and 74b are in the form of cylindrical tubes 339 and 340, each having a larger internal diameter than the largest cross-sectional dimension of the beam. Each tube is closed at its ends by means of rock-salt windows 341 and 342 suitably secured and hermetically sealed in place. The two tubes 339 and 340 are rigidly secured together by means of transverse rods 346 and 347 and two L-shaped pieces of tubing 349 and 350 connected together at their corners. These tubings provide connecting passages extending respectively between chambers 352 and 353 in the respective cells 74a and 74b and external gas handling apparatus.

The two cells are arranged with their axes parallel and the two tubings 349 and 350 terminate in outwardly-facing female ball-joint elements 355 and 356 at opposite ends of a third axis parallel to the axes of the cells and below the path 25 of the beam. The gas-sample holder 72 is arranged for rotation about this third axis by means of tube leads 358 and 359 provided with male ball-joint elements 361 and 362 complementary to the female elements at the ends of the tubings 349 and 350. The tube lead 358 is rigidly secured to the floor of the compartment and terminates in a vertically rising section upon which its ball-joint element 361 is elbowed. The tube lead 359 is pivotally supported about its length on the floor of the compartment 22 and terminates in a rising section upon which its ball-joint element 362 is elbowed. The two rising sections of the tube leads are normally urged together to seal the ball joints formed by said elements by means of a coil spring 364 connected between the movable tube lead 359 and the far wall of the compartment.

Gas samples may be introduced into and removed from the first gas-sample test cell 74a through the connecting tube 349 and the stationary tube lead 358 by suitable manipulation of external gas handling apparatus connected to this tube lead. In a similar manner gas samples may be introduced into and removed from the second gas-sample test cell 74b through the tube 350, the movable tube lead 359 and a stationary tube lead 367 with which the pivoted tube lead 359 is sealed by means of a ball joint 368.

Tubes 339, 340, 349, 350, 358 and 359 and the ball and socket couplings may conveniently be constructed entirely of glass, to gain the advantages of transparency and chemical inertness available in this material.

The mechanism for moving the gas cells into and out of alignment with the path 25 of the beam includes a semi-circular gear 371 journalled in the wall of the compartment 22 directly beneath the light path 25 and attached by means of a shaft 373 to the gas-sample holder 72 coaxially with the ball joints about which the gas-sample holder rotates. The shaft 373 carries within the compartment 22 a sectored disk 375 having an arm 376 extending therefrom and rigidly secured to one of the rods 347 that interconnect the two gas cells. The disk 375 is provided with three notches 377, 378, and 379 on the periphery thereof, which are arranged to selectively engage a plunger 380 pushed upward from the floor of the compartment by means of a suitably arranged spring 381. The middle notch 378 corresponds to the position in which the two cells are in a neutral position withdrawn from the beam path. The remaining notches correspond to settings of one or the other of the gas cells in the beam path. The gas-sample holder is moved from one position to another by means of a rack 383 which engages the semi-circular gear 371 and which is operated by means of the operating rod 76 extending through the compartment wall.

When analyzing liquid samples with the apparatus hereinabove described, the gas-sample holder is held in its neutral position. However, when analyzing gas samples, the liquid-sample holder is held in its neutral position. Thereupon a series of gas samples may be tested in a number of ways. For instance, if it is desired to make direct comparison between two gas samples, the two samples are introduced into the two gas cells and the respective gas cells positioned in the path of the beam one at a time, a spectrogram of each being run in the manner hereinabove described. The two spectrograms are then compared to ascertain similarities and differences between the samples. If it is desired to obtain spectrograms for a series of samples, such as a mixture and pure samples of each of its components, one of the samples in question is fed into one of the sample cells and, while a spectrogram on this sample cell is being run, another sample is fed into the other sample cell. Then while the second sample cell is positioned in the beam to obtain the spectrogram of the enclosed sample, the first sample is evacuated form the first cell and replaced by a third sample. The third sample is then tested and the second sample replaced by a fourth and so on until all samples have been tested, the entire operation being accelerated by virtue of the fact that one sample cell can be filled with a new sample while the sample in the other cell is being tested. The freedom of the spectrophotometer from zero drift and variations in source intensity greatly facilitates these operations. This feature permits direct comparison between curves, taken under like conditions except for samples, to be made with assurance that differences of appreciably larger magnitude than any "noise," or random fluctuations, represent significant differences between samples.

The wall 43 separates the main portion of the gas-sample compartment 22 from the auxiliary compartment section 19 in which the mirror 62, the mirror 64, the lens 65, and the radiation detector 14 are located. The upper horizontal portion of said wall 43 of this compartment section is located entirely beneath the beam path 25. The plane mirror 62 is secured to the wall 43 within the compartment section 19 opposite the aperture 44b, and is so oriented that the radiation transmitted thereto through the exit slit 60 of the monochromator 18 is reflected toward the concave mirror 64 which in turn focuses this radiation through lens 65 upon the detector 14.

*Monochromator*

Considering now the monochromator 18, and more particularly the slit-width control mechanism, reference is made to Figs. 17 and 18 wherein there is illustrated a pair of slit-defining jaws 387 and 388 which are provided with mating curved edges and which are divided into upper and lower portions by transverse slots 391 and 392. The upper portions of the slit jaws 387 and 388 define the entrance slit 40 opposite the entrance aperture 45a and the lower portions of the slit jaws define the exit slit 60 opposite the exit aperture 45. The two slits, defined by the upper and lower portions of the slit jaws 387 and 388, are masked from each other by means of a vane 394 projecting horizontally through the slots. This vane is carried by a cross piece 395 supported from the end wall of the monochromator crosswise of the two slits.

The two slit jaws 387 and 388 are arranged to be moved toward and away from each other together, so that both slits may be closed or opened simultaneously to the same extent. To accomplish this unison of movement, the two slit jaws 387 and 388 are rigidly secured to two working jaws 397 and 398 which are supported at their upper ends on blocks 400 and 401 and which are adapted to be moved horizontally parallel to the floor of the monochromator. The nearly horizontal motion of each working jaw is achieved respectively by means of two pairs of vertical support arms 403, 403, and 404, 404, each of which is resiliently connected by a corresponding flexible hinge member 406, 406 and 407, 407 to one of the blocks 400, 401, and also resiliently supported by corresponding flexible hinge members 409, 409 and 410, 410 on one of two base members 411 and 412 attached to the floor of the monochromator. More particularly, the upper cross block 400, the two vertical cross arms 403, 403 and the base member 411 provide one parallelogram arrangement for moving the first slit jaw 387 and the first working jaw 397 nearly horizontally and without rotation. Also, the upper cross arm 401, the two vertical cross arms 404, 404 and the base members 412 provide another parallelogram arrangement for moving the second slit jaw 388 and the second working jaw 398 nearly horizontally and without rotation.

The flexible hinge members are pre-loaded in such a manner as to urge the slit jaws 387 and 388 together in slit closing relationship. An oblate cam 414 is arranged between two opposed fingers 415 and 416 constituting the upper ends of the working jaws 397 and 398.

Two masking vanes 399, supported angularly from the walls of the compartment at positions adjacent the slit jaws, serve to reduce scattering of light through the exit slit 60.

This oblate cam 414 may be rotated to move the jaws apart against the pressure of the flexible hinge members by operation of a gear 417 which is operated by a worm 418 mounted upon a shaft 420 extending through the upper wall 422 of the compartment 23, and connected externally to a knob 423. A spur pinion 425 on the shaft 420 drives a large gear 426 which carries a dial 428 calibrated in terms of slit-width. This dial is carried upon the upper face of the large gear 426, and is viewable through a window 430 in the upper wall 422 of the compartment. A pointer 432 mounted between the window 430 and the dial 428 is used to indicate slit-width.

In considering the spectrum scanning mechanism and wavelength selecting mechanism illustrated in Figs. 19 and 20, it is well to recall that heterogeneous radiation entering the monochromator 18 through the upper slit 40 is reflected by the stationary concave mirror 46 to the stationary dispersing prism 48 and thence to the rotatable Littrow plane mirror 50 being returned along a similar path to the lower or exit slit 60 and thence to the detector 14 as previously explained in connection with Fig. 1. Also, as previously explained, a spectrum of the radiation is present at the plane of the slit 60 and the wavelength of the particular radiation which is focused upon the exit slit depends upon the position of the Littrow mirror 50. The position of the mirror 50 may be selectively set at predetermined positions corresponding to predetermined wavelengths, to make spot checks, by means of a turret stop mechanism 434 in the monochromator or it may be turned continuously from one position to another to scan the entire spectrum, as by use of a scanning mechanism 435 in the monochromator.

The Littrow mirror 50 is mounted upon a rotatable cross arm 437 to which two truss arms 439 and 440 are rigidly fastened. The longer of these truss arms 439 extends to a point opposite the turret stop mechanism 434; the shorter arm 440 is rigidly secured to the longer arm 439 by means of a clamp 441 at about its mid-point.

A cam-follower arm 442 is pivoted upon a bracket 443 to swing about an axis parallel to the pivot axis of the Littrow mirror 50. This arm 442 is connected to the clamp 441 in driving relation by means of a link 444 which is pivotally supported upon the clamp 441 and which is urged to a home position in a pocket 446 upon the cam-follower arm 442 by means of a coil spring 448 connected between the cross arm 437 and the wall of the compartment 23. The homing of this link 442 is facilitated by means of a funnel 450 which is pivotally connected to the follower arm 442 with its apex bounding the pocket 446. The truss arms 439 and 440, the cam-follower arm 442, and the link 444 comprise the linkage 165 which cooperates with the cam 166 to scan a spectrum.

The cam 166 is provided with a downwardly projecting spiral or scroll cam element 452 upon its lower face which engages an upwardly projecting cam-follower pin 454 on the cam-follower arm 442. This pin 454 is held against the cam element 452 by means of a spring 456 connected to the follower arm 442 through a wire 458 which is stretched over a series of pulley wheels 459, 459. The wheels 459 are so positioned that the cam-follower pin 454 is held against the inner surface of the cam element 452, and the wire 458 returns to the back of the compartment along a line 457 parallel to the general direction of motion of the cam-follower pin. An arm 460, attached at one end to the wire 458, is arranged to slide upon two rods 462, 462 in a direction parallel to the line 457, and in a plane above the cam 116. A window 464 is arranged in the arm 460 directly above that radius of the cam 166 which is parallel to the line 457. Within this window, there is supported a wavelength indicating crosshair 465, and which is located directly above and parallel to said radius. The upper surface of the cam 166 carries a wavelength dial 466 on which is printed a spiral scale calibrated in wavelength, this scale spiralling in a direction opposite to the spiral cam element 452.

The cam 166 may be rotated either by a knob 467 at the outer end of its shaft 468 or by means of a motor-driven gear 469 at the outer periphery of the cam 166. This gear 469 is driven directly by a pinion or jack shaft 471 which in turn is driven through gearing 169 by the motor 168 through a speed changer 472. The speed changer 472 includes suitable mechanism for declutching the gearing 169 from the motor 168 and for reversing the rotation of the cam 166.

Consider now the operation of the scanning mechanism 435, commencing with the cam-follower pin 454 at the outermost end of the cam element 452. In this position, radiation of wavelength 15μ emerges from the exit slit 60. As the cam 166 turns upon its axis, the position of the Littrow mirror 50 is altered in a corresponding manner, thus causing radiation of shorter and shorter wavelengths to be focused upon the exit slit 60 until the pin reaches its innermost position where radiation of wavelength 1μ emerges from the exit slit. Concurrently, the indicating crosshair 465 moves radially outwardly of the cam 166, successively passing over different portions of a spiral scale printed upon the wavelength dial 466 and indicating at each position the approximate central wavelength of the band of radiation then in focus upon the exit slit 60.

When the motion of the cam 166 is reversed, the cam-follower pin 454 is moved radially inward and the indicating crosshair 465 moves radially outward, again, however, indicating at each position the wavelength of the radiation then in focus upon the exit slit 60.

When the cam-follower pin 454 is in its outermost radial position, the mirror 50 may be effectively disconnected from the cam-follower arm 442 by turning a crank arm 475 from its retracted full-line position to an operating dotted-line position, wherein a wheel 476 at its outermost end engages the long arm 439 and holds it away from the turret structure 434 against the force of the spring 448. In this position the link 444 is not in contact with the cam-follower arm 442. Whenever the crank arm is returned to its retracted position the link 444 is guided by the funnel 450 toward its home position.

Turret stop mechanism

The turret stop mechanism 434 which serves to set the Littrow mirror 50 at selected predetermined positions comprises a drum 478 which is arranged upon a horizontal shaft 479 and is rotatable about the shaft axis by means of an external manual control knob 480 operating through a gear train 481. A plurality of pins 483, 483 are arranged circumferentially about the face 485 of the drum 478 remote from the shaft 479. These pins extend from the drum 478 toward the long truss arm 439. The drum 478 is so located that, as it is rotated, each of the pins 483 may in turn engage a fixed bearing plate 486 at the end of the long truss arm 439, and thus hold the mirror 50 in a predetermined position corresponding to a predetermined wavelength.

The pins 483 are preferably of different lengths and are preferably threaded into threaded bores of the drum 478 to permit fine wavelength adjustments, the pins being preferably locked in their positions on the drum by means of set screws 488 arranged on the periphery of the drum. Each pin 483 may be accurately registered with the bearing plate 486 by means of a register pin 490 which engages one of a plurality of corresponding register holes 491 on the face 485 of the drum outside the circle of pins 483. The register pin is carried by a leaf spring 493 which normally urges the pin 490 against the face of the turret drum and into one of the register holes 491 but the register pin may be withdrawn from such hole by means of a cam 495 carried on the same shaft as the crank 475. This cam comes into operation to disengage the register pin from a register hole when the crank 475 is moved into its operating position to engage the long truss arm 439.

The particular pin 483 which is in position to engage the long truss arm 439 at any time, is indicated on a dial 496 mounted externally of the compartment 23 by a pointer 497 attached to the inner end of the knob 480.

To calibrate the monochromator, the turret stop mechanism 434 is first turned to a position in which no pin 483 is capable of engaging the bearing plate 486 in any position throughout the entire range of movement of the long truss arm 439. Then a series of samples, having sharp absorption bands at known wavelengths are positioned one at a time either in a gas-sample cell or a liquid-sample test cell, as the case may be. The wavelength cam 166 is then turned to a position corresponding to an absorption band of known wavelength and the portion of the wavelength dial 466 then located directly beneath the indicating crosshair 465 is marked to indicate that wavelength. When a sufficiently large number of such wavelengths are so indicated, the dial is removed from the monochromator and calibrated carefully throughout the entire range of the instrument by interpolation.

Once the wavelength dial 466 has been carefully calibrated, the turret stop mechanism 434 may be calibrated as desired for setting upon any selected set of wavelength positions. This may be done, for example, by setting the cam 166 at one of these positions, then installing upon the drum 488 one of the pins 483 and then adjusting the length of this pin until it just engages the bearing plate 486. Alternatively, since it is usually desired to adjust the turret head to particular positions corresponding to certain absorption regions, a sample characterized by the absorption band in question is positioned in the spectrophotometer and then the wavelength cam 166 is turned to a position corresponding to a point of maximum absorption in one of these bands. Thereafter, a corresponding pin 483 of suitable length is screwed into the turret drum 434 and with the cam 166 so set and the link 444 engaged, this pin is unscrewed so that its length increases to the point where it just engages the bearing plate 486. The position at which it engages the bearing plate 486 may be indicated by the fact that the arm 439 lifts out of engagement with the cam-follower arm 442 thus turning the mirror 50 and increasing the signal indicated at the output of the spectrophotometer. When the length of the pin 483 is so adjusted, it is locked tightly in its position by means of a corresponding set screw 488. This procedure is repeated at different wavelengths until a set of pins of suitable length are arranged upon the turret drum. With this method of calibration, very accurately reproducible results may be quickly and conveniently obtained.

In making a spectrogram of an unknown sample, the turret drum is turned to a position which no pin 483 interferes with the movement of the long truss arm 439 and a record is made, in the manner previously explained. When it is desired to make a series of spot checks of a sample at predetermined wavelengths corresponding to the various lengths of pins installed upon the turret head, the cam 166 is rotated to a position in which the cam-follower pin 454 is in its outermost position. Also the crank arm 475 is moved to a position in which the wheel 476 engages the long truss arm 439, thereby disengaging the mirror 50 from the cam 166. The knob 480 is then turned to a position corresponding to the predetermined wavelength at which measurements are desired. Then the crank 475 is returned to its withdrawn position thereby permitting the bearing plate 486 to seat itself upon the pin with which it is then in register. After the measurements are made at the wavelength corresponding to that pin, the crank 475 is again moved to the position in which it engages the long truss arm 439 thereby lifting the bearing plate 486 from the previously engaged pin. The knob 480 is then rotated to position a second pin in register with the bearing 486 and the procedure repeated. This same procedure is repeated as often as desired within the limits established by the number of pins arranged upon the turret head.

It is to be emphasized that many problems in spectroscopy arise which may vary from those referred to specifically in the above disclosure, and that corresponding variation in the test procedure must be made in order to solve these particular problems. The basic principles involved in approaching the solution to these problems will, however, be the same as those hereinabove set forth, and the variations that may be necessary therein in order to accommodate these principles to special problems will be apparent to those skilled in the art from the foregoing disclosure. Accordingly, the invention is not to be limited to the various details of apparatus and test procedure described in detail hereinabove, and it is to be understood that various modifications and changes may be made therein within the scope of the appended claims.

We claim as our invention:

1. In the method of spectrometry in an infrared radiation wavelength region wherein both selected radiation of predetermined wavelength and false energy radiation of other wavelengths are transmitted to a radiation reception zone, the steps which comprise: transmitting said selected and false energy radiation to said reception zone along a common path; periodically attenuating the selected radiation transmitted to the reception zone at a predetermined frequency; simultaneously attenuating the false energy radiation transmitted to the reception zone to a relatively small extent for a relatively long period of time in phase with the attenuation of said selected radiation and to a relatively large extent for a relatively short period of time out of phase with the attenuation of said selected radiation, thereby causing the radiation intensity at the reception zone to vary periodically in amplitude at said frequency in accordance with the intensity of only the selected radiation; and measuring the amplitude of intensity variation of the received energy at said frequency.

2. In a spectrophotometer which includes a source of radiation and a radiation detector, the combination which comprises: means for directing radiation to said detector from said source, said radiation comprising selected radiation of a predetermined wavelength and false energy radiation of another wavelength; a shutter structure comprising filter means adapted to discriminate between selected radiation of said predetermined wavelength and radiation having wavelengths of said false energy radiation by preferentially attenuating said selected radiation; means for periodically interposing said filter means at a predetermined frequency into the path of the radiation directed to said detector, whereby said filter means attenuates said selected radiation at said frequency without substantially attenuating said false energy radiation at said frequency; an amplifier means connected to said detector and having oppositely phased output portions having a common terminal; receptive means including two terminals, one of said terminals being connected to said common terminal and the other being a switched terminal; and a switch means for alternately connecting said oppositely phased output portions to said switched terminal in step with said predetermined frequency.

3. In a spectrophotometer which includes a source of radiation and a radiation detector, the combination which comprises: means for directing radiation to said detector from said source, said radiation comprising selected radiation of a predetermined wavelength and false energy radiation of another wavelength; a shutter structure comprising filter means adapted to discriminate between selected radiation of said predetermined wavelength and radiation having wavelengths of said false energy radiation by preferentially attenuating said selected radiation; means for periodically interposing said filter means at a predetermined frequency into the path of the radiation directed to said detector, whereby said filter means attenuates said selected radiation at said frequency without substantially attenuating said false energy radiation at said frequency; an amplifier means connected to said detector; means including a switch operated at said frequency for periodically varying the gain of said amplifier means; and means for phasing the operation of said switch relative to the times of interception of said radiation by said filter means, whereby the gain of said amplifier means is of one value while the selected radiation is attenuated and of another value while the selected radiation is unattenuated.

4. In a spectrophotometer which includes a source of radiation and a radiation detector, the combination which comprises: means for directing radiation to said detector from said source, said radiation comprising selected radiation of a predetermined wavelength and false energy radiation of another wavelength; a shutter structure comprising filter means adapted to discriminate between selected radiation of said predetermined wavelength and radiation having wavelengths of said false energy radiation by preferentially attenuating said selected radiation; a motor for driving said shutter structure to periodically interpose said filter means at a predetermined frequency into the path of radiation directed to said detector whereby the flow of false energy to said detector does not substantially vary at said frequency and the flow of said selected radiation to said detector substantially varies at said frequency; an amplifier connected to said detector and providing an output fluctuating at said frequency; and a mechanical rectifier receiving and rectifying said output and including a switching means driven by said motor synchronously with the interposing of said filter means in said path.

5. In a spectrophotometer which includes a source of radiation and a radiation detector, the combination which comprises: means for directing radiation to said detector from said source, said radiation comprising selected radiation of a predetermined wavelength and false energy radiation of another wavelength; a shutter structure comprising filter means adapted to discriminate between selected radiation of said predetermined wavelength and radiation having wavelengths of said false energy radiation by preferentially attenuating said selected radiation; a motor for driving said shutter structure to periodically interpose said filter means at a predetermined frequency into the path of radiation directed to said detector whereby the flow of false energy to said detector does not substantially vary at said frequency and the flow of said selected radiation to said detector substantially varies at said frequency; an amplifier means connected to said detector; switching means for varying the gain of said amplifier means; a cam driven by said motor for operating said switching means at said frequency; and means for measuring the output of said amplifier means.

6. In a spectrophotometer which includes a source of radiation, a radiation detector, and means for directing radiation of a predetermined wavelength from said source to said detector, the combination of: a rotary shutter for modulating the intensity of radiation directed from said source to said detector; an amplifier means connected to said detector; means for varying the gain of said amplifier means, said means including a switching means; a motor; shaft means connecting said motor to said shutter in driving relationship; and a cam on said shaft means for periodically operating said switching means in synchronism with the rotation of said shutter by said motor to vary the gain of said amplifier means.

7. In a spectrophotometer which includes a source of radiation, a radiation detector, and means for directing radiation of a predetermined wavelength band from said source to said detector, the combination of: a shutter for modulating the intensity of radiation directed from the source of the detector, said shutter comprising a filter element formed of a material substantially transparent to a portion of the radiation in said band and substantially opaque to another portion of the radiation in said band; an amplifier means connected to said detector; means including a switch for varying the gain of said amplifier means according to whether said switch is opened or closed; means for periodically opening and closing said switch in synchronism with the modulation of said radiation by said shutter; and means for adjusting the timing of the opening and closing of said switch relative to the modulation of said radiation.

8. In a spectrophotometer which includes a source of radiation, a radiation detector, and means for directing radiation of a predetermined wavelength from said source to said detector, the combination of: a shutter for modulating the intensity of radiation directed from the source to the detector; an amplifier means connected to said detector; means including a switch for varying the gain of said amplifier means according to whether said switch is opened or closed; a motor for driving said shutter; a first shaft connected to said motor; a second shaft connected to said shutter; a cam on said first shaft for periodically opening and closing said switch; an angularly adjustable coupling between said first and second shafts; and means for measuring the output of said amplifier means.

9. In a spectrophotometer which includes a source of radiation and a radiation detector, the combination which comprises: means for directing radiation from said source to said detector, said radiation comprising selected radiation energy of predetermined wavelength and also false energy radiation of another wavelength; a plurality of shutter segments at least two of which have different attenuation ratios with respect to said selected radiation and said false energy radiation; means for cyclically interposing said shutter segments into the path of the radiation directed to said detector whereby there is a pulsating flow of said selected radiation to said detector at a predetermined frequency and substantially less variation in the rate of flow of false energy radiation to said detector at said frequency; an amplifier means connected to said detector, said amplifier means being tuned to said frequency; and means operated in synchronism with the pulsation of the flow of energy to said detector for periodically varying the gain of said amplifier means at said predetermined frequency.

10. In a radiation measuring device, in which a beam of infra-red radiation is transmitted from a source of radiation, the combination of: two shutter elements, one of said shutter elements being capable of transmitting both selected radiation in a higher-wavelength range in the infra-red region and false energy radiation in a lower-wavelength range of the infra-red region, the other of said shutter elements being capable of transmitting said lower-wavelength false energy radiation and attenuating said selected radiation of higher wavelength, both shutter elements being capable of reflecting substantially equal amounts of said lower-wavelength false energy radiation; means for alternately interposing said shutter elements into said beam at a predetermined frequency whereby the intensity of only the selected radiation of higher wavelength varies at said predetermined frequency; and a radiation detecting means responsive to variations in radiation intensity at said predetermined frequency.

11. In a spectrophotometric apparatus operable in a predetermined wavelength range of a beam of radiation, the combination of: a motor; a first rotatable shutter comprising a filter sector formed of a material substantially transparent to radiation in one portion of said wavelength range and substantially opaque to radiation in another portion of said wavelength range; means for constantly connecting said first rotatable shutter to said motor in position to swing said filter sector successively through said beam; a second rotatable shutter comprising a beam-interrupting shutter sector formed of a material capable of substantially blocking the radiation of said beam throughout said wavelength range; a two-position rotatable control means operatively connecting said shutters and operative between first and second positions, said control means when in said first position driving said shutters synchronously from said motor with said sectors oriented in a single relationship with said shutter sector fully overlying said filter sector and thereby causing said sectors simultaneously to intercept said beam, said two-position control means being operative when moved to said second position to remove said shutter sector from said beam during continued rotation of said first shutter; and means for operating said two-position control means during continued rotation of said motor to effect selective interruption of said beam by said filter sector alone and by both said sectors.

12. In a spectrophotometric apparatus operable in a predetermined wavelength range of a beam of radiation, the combination of: a motor; a first rotatable shutter comprising a filter sector formed of a material substantially transparent to radiation in one portion of said wavelength range and substantially opaque to radiation in another portion of said wavelength range; means for constantly connecting said first rotatable shutter to said motor in position to swing said filter sector successively through said beam; a second rotatable shutter comprising a beam-interrupting shutter sector formed of a material capable of substantially blocking the radiation of said beam throughout said wavelength range; a two-position rotatable control means operatively connecting said shutters and operative between first and second positions, said control means when in said first position driving said shutters synchronously in beam-interrupting relationship, said control means including a stop means set to orient said sectors in a single fixed relationship in which said shutter sector fully overlies said filter sector when said control means is in said first position thereby causing said sectors simultaneously to interrupt said beam while in overlying relationship, said two-position control means being operative when moved to said second position to remove said shutter sector completely from said beam, said control means being operable between said two positions during continued rotation of said first shutter; and means for operating said two-position control means during continued rotation of said motor to effect selective interruption of said beam by said filter sector alone and by both said overlying sectors.

13. In a radiation measuring device for measuring radiation from a source, the combination of: a first shutter sector capable of substantially attenuating radiation in one range of wavelengths from said source while transmitting radiation in another range of wavelengths from said source with little attenuation; a second shutter sector capable of transmitting radiation in both ranges with little attenuation; rotatable means for supporting said shutter sectors in diametrically opposed positions on opposite sides of the axis of rotation thereof; means for rotating said rotatable means to vary the shutter-transmitted radiation at a selected frequency; a radiation detector responsive to said shutter-transmitted radiation and producing an output signal fluctuating at said frequency; and an amplifier responsive only to such fluctuations of said output signal.

14. In a radiation measuring device for measuring radiation from a source, the combination of: a first shutter sector capable of substantially attenuating radiation in one range of wavelengths from said source while transmitting radiation in another range of wavelength from said source with little attenuation; a second shutter sector capable of substantially attenuating radiation in both ranges; rotatable means for supporting said shutter sectors in diametrically opposed positions on opposite sides of the axis of rotation thereof; means for rotating said rotatable means to interpose said first and second sectors in said radiation sequentially to vary the shutter-transmitted radiation at a selected frequency; a radiation detector responsive to said shutter-transmitted radiation and producing an output signal fluctuating at said frequency; and an amplifier responsive only to such fluctuations of said output signal.

15. A radiation measuring device as defined in claim 14 in which said first shutter sector is of wider angle than said second shutter sector, measured around said axis of rotation.

16. A radiation measuring device as defined in claim 14 in which said first shutter sector extends approximately 180° around said axis of rotation and in which said second shutter sector subtends a substantially smaller angle about said axis.

17. In a spectrophotometer including means for projecting radiation in a predetermined wavelength range along a predetermined path, the improvement which comprises: a first shutter including a first sector mounted upon a shaft for rotation across said path, said first sector being adapted to substantially attenuate radiation in a portion of said range and to transmit radiation in the remainder of said range with little attenuation; a second shutter including a second sector adapted to substantially attenuate radiation throughout said range; rotatable clutching means carried by one of said shutters for engaging said other shutter for registering the two sectors in overlying relationship for simultaneous rotation across said path; and means for disengaging said clutching means to withdraw said second shutter from said path while said first shutter is rotating.

18. In a spectrophotometer: a source of radiation comprising an electrically heated element;

a first radiation detector; means for directing selected radiation of a predetermined wavelength from said source to said first detector and also false energy radiation of another wavelength thereto from said source; a plurality of shutter segments at least two of which have different attenuation ratios with respect to said selected radiation and said false energy radiation; means for cyclically interposing said shutter segments into the path of the radiation directed to said detector to establish a pulsating flow of said selected radiation to said detector at a predetermined frequency with substantially no variation in the rate of flow of false energy to said detector at said frequency; amplifying means connected to said detector selectively responsive to variations in the rate of flow of energy to said detector at said frequency; a second radiation detector; means for directing radiation from said source to said second detector; means controlled by the intensity of radiation directed to said second detector for regulating the power applied to said electrically heated element to maintain substantially constant the intensity of selected radiation and false energy radiation emitted by said source.

HENRY H. CARY.
ROLAND C. HAWES.
KENYON P. GEORGE.

REFERENCES CITED

The following references are of record in the file of this patent:

UNITED STATES PATENTS

| Number | Name | Date |
|---|---|---|
| 947,490 | Gwozdz | Jan. 25, 1910 |
| 1,107,438 | Moskowitz | Aug. 18, 1914 |
| 1,175,951 | Kunz | Mar. 21, 1916 |
| 1,573,890 | Woodward, et al. | Feb. 23, 1926 |
| 1,794,727 | O'Grady | Mar. 3, 1931 |
| 1,799,134 | Hardy | Mar. 31, 1931 |
| 1,860,824 | Tate | May 31, 1932 |
| 1,860,967 | Tate | May 31, 1932 |
| 2,107,836 | Pineo | Feb. 8, 1938 |
| 2,162,529 | Dawson et al. | June 13, 1939 |
| 2,166,947 | Fayerwether | July 25, 1939 |
| 2,189,270 | Pineo | Feb. 6, 1940 |
| 2,269,674 | Liddel et al. | Jan. 13, 1942 |
| 2,289,054 | Dimmick | July 7, 1942 |
| 2,289,322 | Nelson | June 23, 1942 |
| 2,312,010 | Akker | Feb. 23, 1943 |
| 2,314,800 | Pineo | Mar. 23, 1943 |
| 2,328,293 | Pineo | Aug. 31, 1943 |
| 2,329,657 | Shurcliff | Sept. 14, 1943 |
| 2,383,075 | Pineo | Aug. 21, 1945 |
| 2,384,260 | Goldsmith | Sept. 4, 1945 |
| 2,403,685 | Sachtleben et al. | July 9, 1946 |
| 2,422,971 | Kell | June 24, 1947 |
| 2,424,976 | Golay et al. | Aug. 5, 1947 |
| 2,442,298 | Liston | May 25, 1948 |
| 2,442,910 | Thomson | June 8, 1948 |
| 2,451,572 | Moore | Oct. 19, 1948 |

FOREIGN PATENTS

| Number | Country | Date |
|---|---|---|
| 385,821 | Germany | Dec. 12, 1923 |

OTHER REFERENCES

Conn et al., "Infra-Red Spectra," Proceedings of the Royal Society of London, Series A, vol. 176, pages 484–491, November 1940.

Oetjen, "Versatile Infra-Red Spectrograph," Journal of the Optical Society of America, vol. 35, pages 743–754, December 1945.